United States Patent [19]
Bridgelall et al.

[11] Patent Number: 5,988,508
[45] Date of Patent: Nov. 23, 1999

[54] LASER SCANNING SYSTEM AND SCANNING METHOD FOR READING 1-D AND 2-D BARCODE SYMBOLS

[75] Inventors: Raj Bridgelall, Mount Sinai; Joseph Katz, Stony Brook; David Goren, Smithtown; Paul Dvorkis, Stony Brook; Yajun Li, Oakdale, all of N.Y.

[73] Assignee: Symbol Technologies, Inc., Holtsville, N.Y.

[21] Appl. No.: 08/871,615

[22] Filed: Jun. 10, 1997

Related U.S. Application Data

[63] Continuation-in-part of application No. 08/533,021, Sep. 25, 1995, Pat. No. 5,637,856, application No. 08/037,143, Mar. 29, 1993, abandoned, application No. 08/028,107, Mar. 8, 1993, Pat. No. 5,408,081, application No. 08/981,448, Nov. 25, 1992, Pat. No. 5,478,997, and application No. 07/715,267, Jun. 14, 1991, Pat. No. 5,235,167, said application No. 08/533,021, is a continuation of application No. 08/153,053, Nov. 17, 1993, Pat. No. 5,504,316, which is a continuation-in-part of application No. 07/868,401, Apr. 14, 1992, Pat. No. 5,280,165, which is a division of application No. 07/520,464, May 8, 1990, Pat. No. 5,168,149.

[51] Int. Cl.⁶ ...................................................... G06K 7/10
[52] U.S. Cl. ............................................................ 235/462.4
[58] Field of Search ........................ 235/462.36, 462.37, 235/462.38, 462.39, 462.4

[56] References Cited

U.S. PATENT DOCUMENTS

| | | | |
|---|---|---|---|
| 4,039,246 | 8/1977 | Voigt | 350/7 |
| 4,871,904 | 10/1989 | Metlitsky | 350/7 |
| 5,059,779 | 10/1991 | Krichever et al. | 235/467 |
| 5,149,949 | 9/1992 | Wike, Jr. | 235/467 |
| 5,187,612 | 2/1993 | Plesko | 359/896 |

*Primary Examiner*—Donald Hajec
*Assistant Examiner*—Daniel Sherr
*Attorney, Agent, or Firm*—Kirschstein, et al.

[57] ABSTRACT

A reader for electro-optical reading bar code symbols of reduced height, comprises a light source for generating a light beam along an optical path; a pair of oscillatable reflectors in the optical path; a first drive for oscillating the reflectors at different frequencies that are a ratio of about 10%–30% apart to create a scan pattern; and a second drive for rotating the scan pattern about an axis that is generally orthogonal to the scan pattern.

20 Claims, 19 Drawing Sheets

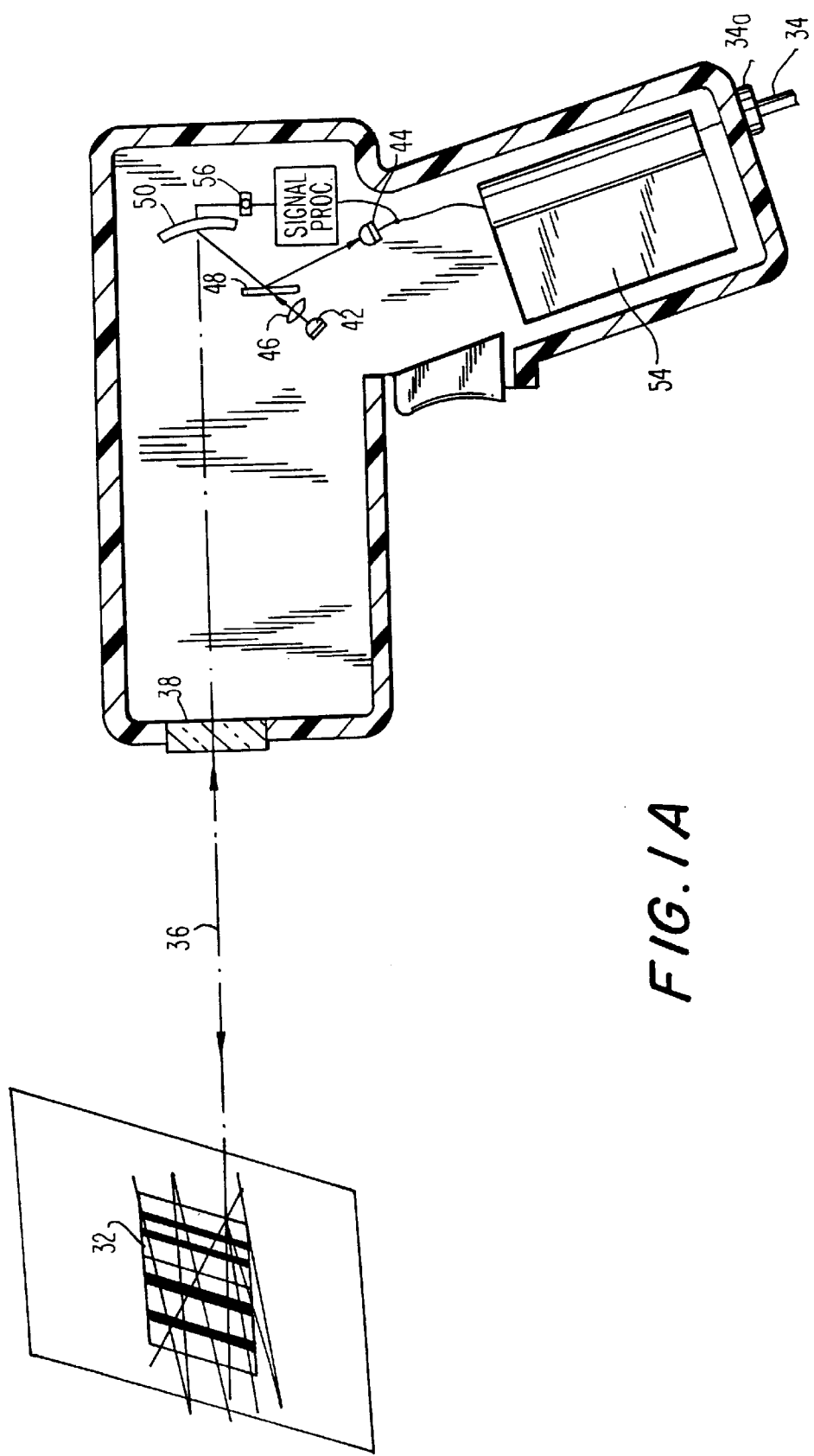
FIG. IA

ROTATING LISSAJOUS

RASTER

ENLARGED RASTER

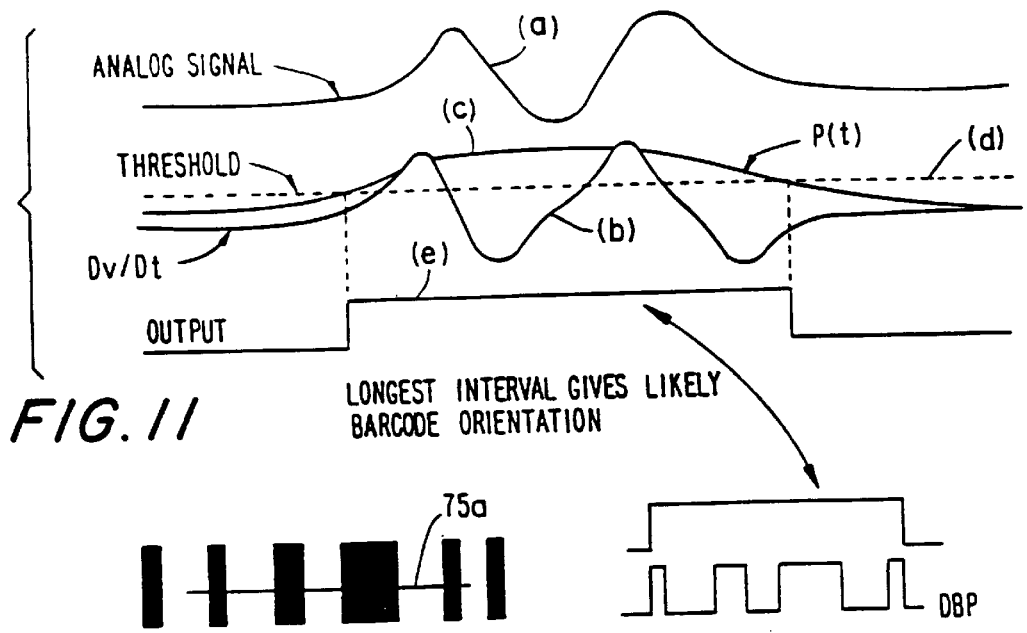
FIG. 11
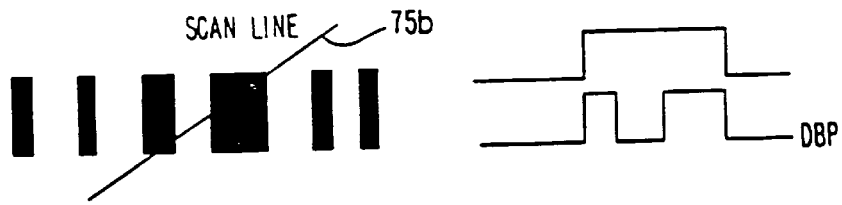
FIG. 10A
FIG. 10B
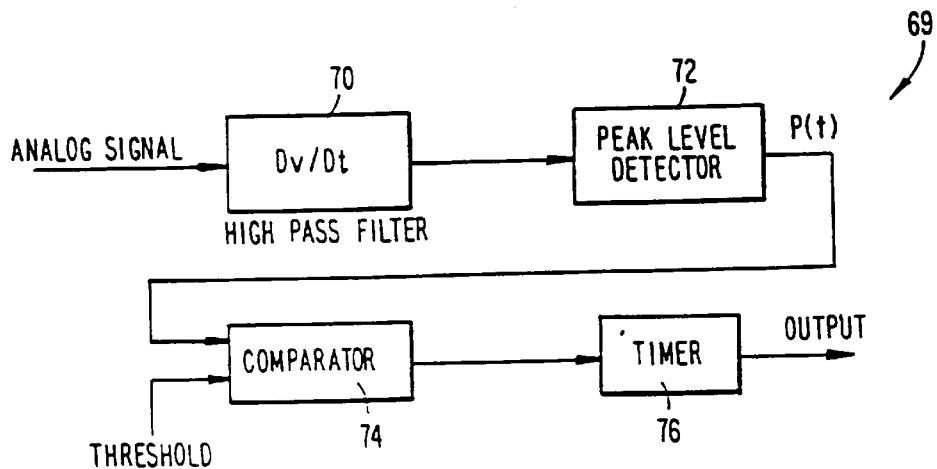
FIG. 12

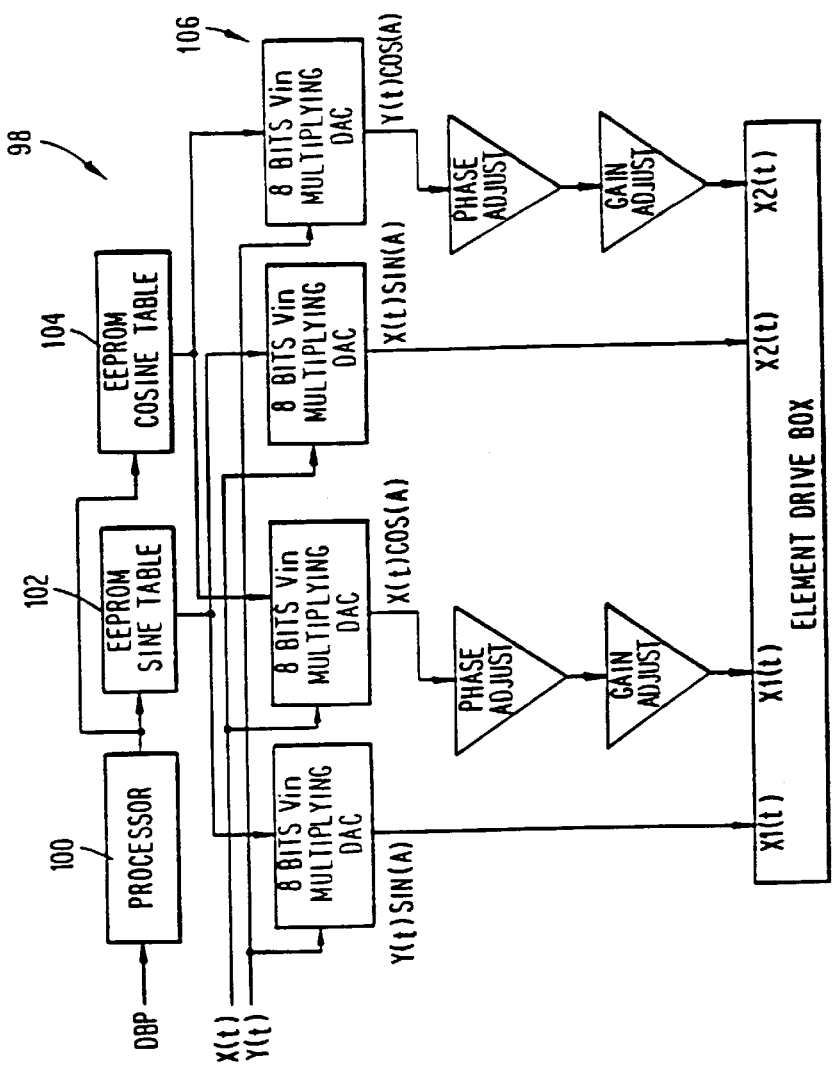
FIG. 14
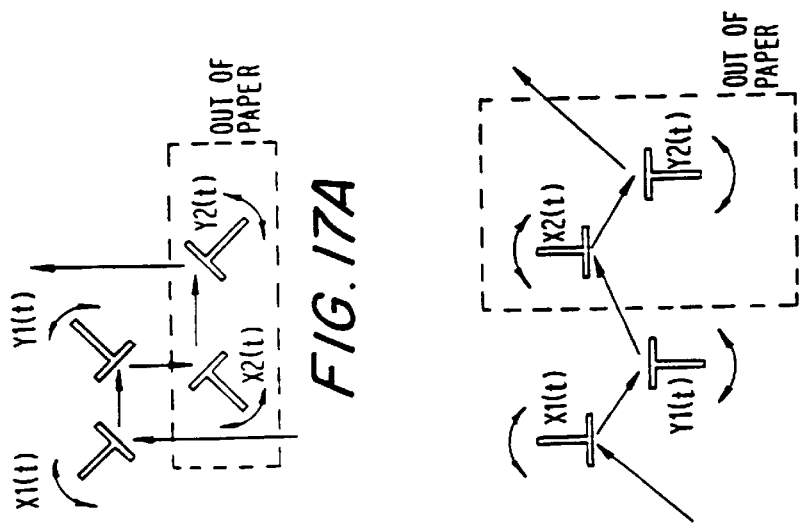
FIG. 17A
FIG. 17B

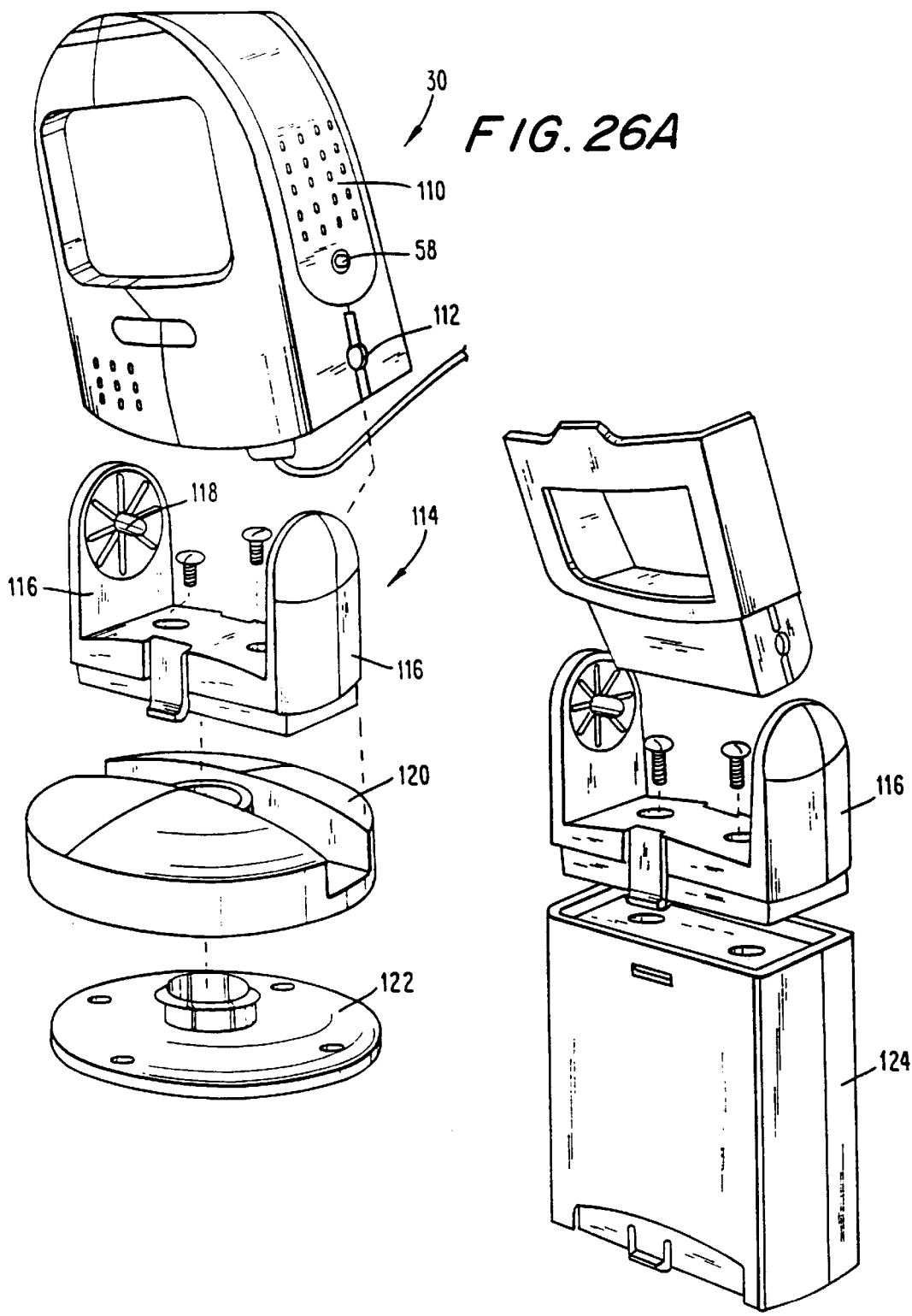

LASER SCANNING SYSTEM AND SCANNING METHOD FOR READING 1-D AND 2-D BARCODE SYMBOLS

This application is a continuation-in-part of Ser. No. 08/533,021, filed Sep. 25, 1995 now U.S. Pat. No. 5,637,856 which is, in turn, a continuation of Ser. No. 08/153,053 filed Nov. 17, 1993 now U.S. Pat. No. 5,504,316, which is, in turn, a continuation-in-part of U.S. patent application Ser. No. 07/868,401, filed Apr. 14, 1992, now U.S. Pat. No. 5,280,165, which in turn is a division of application Ser. No. 07/520,464, filed May 8, 1990, now U.S. Pat. No. 5,168,149.

This application is also a continuation-in-part of U.S. patent application Ser. No. 08/037,143, filed Mar. 29, 1993 now abandoned, Ser. No. 07/715,267, filed Jun. 14, 1991, now U.S. Pat. No. 5,235,167.

This application is also a continuation-in-part of Ser. No. 07/981,448, filed Nov. 25, 1992 now U.S. Pat. No. 5,478,997.

This application is further a continuation-in-part of Ser. No. 08/028,107, filed Mar. 8, 1993 now U.S. Pat. No. 5,408,081.

TECHNICAL FIELD

This invention relates generally to hand-held scanning systems which "read" indicia, such as barcode symbols, and in particular to systems and methods for scanning one-dimensional (1-D) and two-dimensional (2-D) barcode symbols with a first scan pattern that is relatively small and dense so as to be visible to the user, and thereafter a second, larger and more robust scan pattern for decoding. The invention also relates to scanners operable in both portable (hand-held) and surface mounted (hands-free) modes for reading various types of indicia. The invention further relates to novel miniature assemblies capable of 1-D and 2-D scanning.

BACKGROUND ART

Various optical readers and scanning systems have been developed for reading barcode symbols appearing on a label or the surface of an article. The barcode symbol itself is a coded pattern of indicia comprised of a series of bars of various widths spaced apart from one another to bound spaces of various widths, the bars and spaces having different light-reflecting characteristics. The readers and scanning systems electro-optically transform the graphic indicia into electrical signals, which are decoded into alpha-numerical characters intended to be descriptive of the article or some characteristic of it. Such characters typically are represented in digital form, and utilized as an input to a data processing system for applications in point-of-sale processing, inventory control and the like. Scanning systems of this general type have been disclosed, for example, in U.S. Pat. Nos. 4,251,798; 4,360,798; 4,369,361; 4,387,297; 4,409,470 and 4,460,120, all assigned to the assignee of the present invention.

One embodiment of such a scanning system, as disclosed in some of the above patents, resides in, inter alia, a hand-held, portable laser scanning head supported by a user. The scanning head is configured to enable the user to aim the head at a target to emit a light beam toward a symbol to be read, the light source is a laser scanner typically in the form of a gas or semiconductor laser element. Use of semiconductor devices as the light source in scanning systems is particularly desirable because of the small size, low cost and low power requirements of semiconductor lasers. The laser beam is optically modified, typically by a lens, to form a beam spot of a certain size at the target distance. Preferably, the beam spot size at the target distance is approximately the same as the minimum width between regions of different light reflectivity, i.e., the bars and spaces of the symbol.

The barcode symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The number of characters per inch represented by the barcode symbol is referred to as the density of the symbol. To encode a desired sequence of characters, a collection of element arrangements are concatenated together to form the complete barcode symbol, with each character of the message being represented by its own corresponding group of elements. In some symbologies a unique "start" and "stop" character is used to indicate where the barcode begins and ends. A number of different barcode symbologies exist. These symbologies include UPC/EAN, Code 39, Code 128, Codabar, and Interleaved 2 or 5.

In order to increase the amount of data that can be represented or stored on a given amount of surface area, several new barcode symbologies have recently been developed. One of these new code standards, Code 49, introduces a "two-dimensional" concept by stacking rows of characters vertically instead of extending the bars horizontally. That is, there are several rows of bar and space pattern, instead of only one row. The structure of Code 49 is described in U.S. Pat. No. 4,794,239, which is hereby incorporated by reference.

A one-dimensional single-line scan, as ordinarily provided by hand-held readers, functions by repetitively scanning the light beam in a line or series of lines across the symbol using a scanning component such as a mirror disposed in the light path. The scanning component may either sweep the beam spot across the symbol and trace a scan line across and past the symbol, or scan the field in view of the scanner, or do both.

Scanning systems also include a sensor or photodetector, usually of semiconductor type, which functions to detect light reflected from the symbol. The photo-detector is therefore positioned in the scanner or in an optical path in which it has a field of view which extends across and slightly past the symbol. A portion of the reflected light which is reflected off the symbol is detected and converted into an electrical signal, and electronic circuitry or software decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alpha-numeric characters so represented.

The decoding process in known scanning Systems usually works in the following ways. The decoder receives the pulse width modulated digital signal from the scanner, and an algorithm implemented in software attempts to decode the scan. If the start and stop characters and the characters between them in the scan were decoded successfully and completely, the decoding process terminates and an Indicator of a successful read (such as a green light and/or an audible beep) is provided to the user. Otherwise, the decoder receives the next scan, performs another decode attempt on that scan, and so on, until a completely decoded scan is achieved or no more scans are available.

More sophisticated scanning, described in U.S. Pat. No. 5,235,167, assigned to the common assignee, and incorporated herein by reference, carries out selective scanning of 1-D and 2-D barcodes. Preliminary information, such as the barcode type and size, is preliminarily decoded during an aiming mode of operation when a relatively narrow and visible raster pattern is impinged on the target. Based upon the preliminary information, received by the scanner in the form of light reflected from the target, converted to an electrical signal and decoded, an appropriately sized raster scan pattern is generated. If the barcode pattern is found to be skewed or misaligned with respect to the direction of the raster scanning pattern, the pattern is generated with an orientation in alignment with the barcode.

Aligning the scan pattern to the barcode is awkward, especially for long range scanning. If a barcode is not horizontally positioned on, for example, a container, the user is forced to position the scanner sideways in order to scan the barcode. One possible solution, described in the aforementioned U.S. Pat. No. 5,235,167, is to control the scanner to self-orient the scan pattern to the orientation of the barcode.

Scanning 2-D, or PDF, barcodes with a raster pattern also presents a similar problem. At certain distances, the visibility of a 2-D raster pattern is poorer than that of a single line, and orienting the barcode with the scan lines is not effortless. Assuming the pattern to be amply visible, the user may tend to position the 2-D barcode horizontally under a scan lamp. However, it would be ideal if no aligning is required. For example, a 2-D barcode may have been a photocopy vertically aligned onto a page. Upon scanning, the user may first subconsciously attempt to present the page horizontally, and thus present the barcode vertically. Without ability by the scanner to instantaneously sense barcode orientation, and then position a raster pattern to scan it, the user will be forced to realign the page vertically.

Following alignment of the scan pattern to the barcode, the pattern is then increased in width so as to fully span the length of the barcode, and if the pattern is determined to be a 2-D barcode, the height of the scan pattern is also increased so an to decode all of the barcode rows. However, the rate at which the raster pattern is increased in size is fixed and independent of the size of the barcode or the distance between the hand-held scanner and target. At a common rate of pattern size increase, depending upon the size of the barcode it may require from 0.1 to 2.0 seconds to open the scan pattern and decode the barcode. Distance to the target is another factor. Pattern size is incremented until the entire pattern is decoded. The size of each increment of increase in determined in part by the working range of the scanner. Very long range scanners, usable up to sixty feet, for example, may require smaller increments so that the patterns do not grow too fast at the end of a working range where much of the information, including start and stop codes, concerning attributes of the barcode resides. Hence, it would be desirable to control the rate at which the scan pattern grows to decode the barcode depending upon the characteristics of the barcode itself.

The scanner unit must be compact, energy efficient, and capable of scanning both 1-D and 2-D barcodes. The unit preferably will also be convertible between hand and surface support applications. The scan pattern will preferably be optimized in accordance with whether the unit is in hand hold or surface supported modes of operation, whether it is in a presentation type of operation (wherein the indicia are passed under a scan lamp) or a pass through type of operation (supermarket type) and on the type of barcode or other indicia to be read.

DISCLOSURE OF THE INVENTION

A general object of this invention is to improve aim and shoot capabilities of hand-held barcode scanners. A more particular object is to improve the scan pattern visibility of hand-held barcode scanners during aiming. Another object of the invention is to implement robust scan patterns during decoding, and another is to enable the scanner to automatically orient the scan pattern to the rotational orientation of the symbol. A further object is to transition between aiming and decoding automatically while reading 1-D or 2-D barcodes. Other objects of this invention include miniaturizing the scan mechanism so as to enable the scanner to be conveniently hand-held, and compactly housing the scanner, and providing convertibility between hand-held and surface mount applications while automatically generating scan patterns optimized for the particular application and type of indicia being read.

These and other objects and features of the invention are satisfied, at least in part, by a scanning system operable both in portable and fixed modes for reading barcode symbols comprising means for determining whether operation is in a fixed or portable mode, and means for adapting the scan pattern to an optimized pattern for such mode of operation. Preferably, the scan pattern is also optimized in dependency on the type of indicia being read and whether scanning is carried out in a presentation type (under a scan lamp) or a pass through (supermarket) type reader.

In accordance with a preferred embodiment, a light beam scanner generates a light beam directed toward a symbol to be read and moves the beam along the symbol in an omnidirectional scanning pattern, that is, one wherein the pattern trajectory in not limited to one or a limited number of directions while a symbol is traversed. A light detector receives reflected light from the symbol and generates electrical signals responsive to the reflected light, and the scanning pattern is controlled in response to the electric signals. The scanning pattern may be radially symmetric, a rotating line pattern, or a spiral pattern. The pattern control may vary the diameter or trajectory of the light beam, and more particularly may move the light beam selectively along a first scan path or a second scan path depending on the electrical signals. In preferred embodiments, the first and second scan paths differ from each other by rotation about an axis of rotation, by an increase in scan pith envelope diameter, by rotation of the first scan path about an axis of rotation and increase of scan path envelope diameter, or by displacement of the center of rotation of the first scan pattern. Preferably, the scan pattern is such that the bar code is traversed by at least two scan lines per row of bar patterns during reading.

A particular embodiment of the foregoing includes providing a relatively bright, rosette scanning pattern for enabling a user to aim and direct the beam toward a bar code symbol to be read, scanning the symbol, detecting light reflected from the symbol and generating an electrical signal in response to the reflected light, and modifying the radial diameter of the scan pattern in response to the electrical signal.

Another aspect of the invention provides a light source for generating a light beam directed toward a symbol to be read, and a light detector for receiving light reflected from the symbol and, in response, generating an electrical signal. This signal is converted to data corresponding to a content of the symbol. The light beam is controlled to scan the symbol with a prescribed scan pattern to develop first data, and thereafter increase a dimension of the scan pattern at a rate dependent upon that first data.

Preferably, the scan pattern is increased in dimension at a rate, and to a magnitude, that are determined by the decoded signal, to produce ultimate data corresponding to the symbol.

In accordance with a preferred embodiment, the light beam is controlled to scan a symbol in an aim mode of operation and thereafter in a decode mode. The decode mode may follow the aim mode in response to a second manual operation of a trigger, or may occur automatically. In the aim mode, the light beam scans the symbol with a first, relatively small prescribed scan pattern that is visible to the user and corers only a portion of the symbol. The decode mode of operation scans a portion of the symbol with a second (same or different) prescribed scan pattern, and then incrementally increases the size of this second pattern while decoding. Scan patterns found useful for aiming and decoding are spiral, stationary or rotating Lissajous, rotating line and rosette, with the spiral producing the most visible aim pattern and the rotating Lissajous producing the most robust decoding. A stationary or precessing raster pattern is produced for 2-D barcode scanning and decoding.

Although the scan patterns for aiming and decoding may be the same, they preferably are different. In this respect, the symbol is preliminarily analyzed using a rotating Lissajous pattern during the aim mode of operation to determine whether the symbol is one-dimensional or two-dimensional, and, in accordance with another aspect of the invention, the light beam is automatically controlled to describe a stationary or precessing raster scan pattern for decoding if the symbol is two-dimensional. If the scanned symbol is determined to be a one-dimensional symbol, the pattern for aiming and decoding both preferably are a rotating Lissajous. A scan control circuit automatically transitions between the aiming and decoding patterns, such as from Lissajous to raster for 2-D scanning.

In accordance with a further aspect of the invention, the scanner is incorporated within a housing including an approximately square window for enabling the light beam to pass through it. The housing is adapted to be hand-held, and releasably attached to a surface mount base. In a preferred embodiment, the surface mount base enables the housing to rotate about vertical and horizontal axes, and optionally includes a vertical extension to increase the height of the scanner.

Yet another aspect of this invention concerns decoding a barcode that is angularly offset from the horizontal, without prior knowledge by the user, and despite any droop in the scan lines emitted the scanner that is characteristic of some 2-D scanning mechanisms. Advantageously, the light beam is controlled to traverse the symbol with a scan pattern having the form of a raster that precesses among successive frames so as to align with rows of barcode oriented at various angles.

A further aspect of the invention provides system for reading coded indicia, comprising an electro-optical reader within a portable housing having a means for enabling a human operator to hold and aim the reader at indicia to be read. The reader includes a light source for generating a light beam, a light detector for receiving light reflected from the indicia and responsively generating an electrical signal, and means for converting the electrical signal to data representing information content of the indicia. A stationary fixture has a means for supporting the portable housing of the reader when not held by the operator. A scan control means controls the light beam to scan the indicia with different prescribed scan patterns in response to the information content of the indicia and whether the portable housing is separated from or mounted in the fixture.

When the reader is enabled, the scan means controls the light beam to preliminary scan the indicia with a scan pattern, such as a rotating Lissajous, that indexes angularly so as to traverse the indicia along different directions progressively as a function of time. Assume first that the housing is separated from the fixture. When the indicia content corresponds to a 1-D barcode pattern, as determined during preliminary scanning the scan pattern for decoding continues as a rotating Lissajous pattern, in accordance with the preferred embodiment. When the indicia content corresponds to a 2-D barcode pattern, the scan pattern preferably changes to a precessing raster pattern.

If the housing is mounted in the fixture, and the indicia content corresponds to a 1-D barcode pattern, as determine during preliminary scanning the scan pattern for decoding may be a single line or multiple line scan pattern. If the indicia content corresponds to a 2-D barcode pattern, the scan pattern may be a raster pattern. In either case, the scan pattern for decoding is optimized to read the classification of barcode preliminary scanned.

A particularly advantageous "aim and shoot" operation of the scanner, in accordance with the invention, is as follows. The operation comprises first directing a light beam toward a symbol to be read, executing an aim mode of operation by controlling the light beam to scan the symbol with a visible scan pattern in the form of a rotating Lissajous pattern, and then receiving light reflected from the symbol and producing first data identifying an attribute of the symbol including whether the symbol represents a one-dimensional or two-dimensional barcode symbol. The operation then provides executing a decode mode such that (a) if during aiming, the symbol is determined to be a one-dimensional barcode symbol, decoding while scanning using a rotating Lissajous scan pattern to scan the symbol, and (b) if the symbol is determined to be a two-dimensional barcode symbol, decoding while using a raster scan pattern to scan the symbol.

The scanner mechanism, in accordance with a first embodiment, comprises a housing, a source within the housing for emitting a light beam to be reflected from a symbol to be scanned, and a photodetector positioned within the housing for receiving light reflected from the symbol and responsively producing an electrical signal. An optical element is positioned within the housing in a path of the light beam, and a permanent magnet mounted to a support member and produces a magnetic field. An electric coil, mounted with the optical element, is axially displaced from the support member. A plurality of semi-rigid electrically conducting wires interconnect the coil and the support member such that AC drive current applied to the coil through the wires causes the coil to generate an electromagnetic field for interaction with the magnetic field of the permanent magnet to produce oscillator motions of the optical element.

Another scanning mechanism comprises a housing, a source within the housing for emitting a light beam to be reflected from a symbol to be scanned, a photodetector positioned within the housing for receiving light reflected from the symbol and responsively producing an electrical signal, and an optical scanning element in the housing. The optical scanning element is formed by an optical element positioned In a path of the light beam, and a cylindrical permanent magnet mounted to a support member of magnetically permeable material for producing a magnetic field, the cylindrical magnet having an open end opposing the support member. A cylindrical electric coil is mounted to the support member, surrounded by the permanent magnet and itself surrounding a core of the magnetically permeable material. A flexible membrane is mounted to and spans the open end of the cylindrical permanent magnet, and a metal plate of small mass is attached to the membrane in proximity to the electric coil and the core. An optical element is mounted for pivotal movement, and displaced from but axially aligned with the metal plate, and a coupling element of small mass interconnects the optical element and the metal plates. AC drive current applied to the coil causes the coil to generate an electromagnetic field for interaction with the magnetic field of the permanent magnet to produce oscillatory notions of the optical element with repetitive flexing of the diaphragm.

Another embodiment of the invention provides a housing, a source within the housing for emitting a light beam to be reflected from a symbol to be scanned, and a photodetector positioned within the housing for receiving light reflected from the symbol and responsively producing an electrical signal. An optical scanning element in the housing is formed by a reflector or other optical element positioned in a path of the light beam. An electric coil of cylindrical shape is mounted to a support member and produces a varying magnetic field in response to an AC current, and a permanent magnet is mounted in alignment with a central axis, and adjacent one end, of the coil. The reflector for light emitted from the light source is of a mass substantially less than the mass of the permanent magnet. An arcuate bracket of flexible material interconnects the permanent magnet and the reflector.

A further embodiment of scanner mechanism provides a frame formed of flexible material and having first and second opposed ends, and a pair of parallel, slightly spaced apart wires connected to and maintained taut between the ends of the frame. Mounted to the pair of taut wires approximately centrally between the ends of the bracket, a subassembly includes an optical element for directing the light beam, and a permanent magnet coupled to the optical element and developing a magnetic field. An electromagnetic coil receives AC drive current to generate an electromagnetic field for interaction with the magnetic field of the permanent magnet and induce oscillatory motion in a first scanning direction to the optical element.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 1A is a view of a hand-held scanner in cross-section.

FIGS. 10A and 10B depict DBP data streams and signal intervals for two different barcode orientations.

FIG. 11 describes methodology for automatic barcode alignment.

FIG. 12 is a simplified block diagram of a barcode alignment circuit used in the invention.

FIG. 14 is a block diagram of circuitry for generating signals for producing a rotating Lissajous scan pattern.

FIGS. 17A and 17B show two different reflector configurations for producing a rotating Lissajous scan pattern.

FIGS. 26A and 26B are exploded views of two embodiments of palm-held scanner housings, together with a surface mount fixture, in accordance with the invention.

BEST MODE FOR CARRYING OUT THE INVENTION

As used in this specification, the terms "symbol" and "barcode" are intended to be broadly construed and to cover not only patterns composed of alternating bars and spaces of various widths, but also other one or two dimensional graphic patterns, as well as alphanumeric characters.

The invention provides a scanner system in which the scan pattern produced by a light beam is controlled to describe an omnidirectional scanning pattern, light reflected from a symbol is detected, and the scan pattern is thereafter controlled in response to the detected signals. The invention also provides a scanner system and method in which adjustment of the spatial coverage of the scan pattern of a scanning beam is automatically made at a responsively controlled rate to effect an appropriate type of scanning pattern depending upon the type of symbols to be read. The invention further provides a scanning system operation in which two different types of barcodes may be read, a standard linear barcode and a 2-D barcode. The invention provides a technique for determining the type of barcode, its angular orientation, and adjusts the spatial coverage or vertical sweep of the raster scanning beam to fully scan and read a 2-D barcode.

In accordance with a first aspect of the invention, the invention further produces scan patterns for reading indicia, optimized in dependence upon the operating mode of the scanner (portable or fixed) and other criteria. A portion of the barcode is initially scanned by projecting a light beam on the target containing the barcode, and scanning the beam using a pattern that is relatively small and dense so as to be visible to the user for aiming. A portion of the barcode is partially decoded to determine the type, and possible size, of the barcode, whether it is a 1-D or 2-D barcode and its angular orientation. A rotating Lissajous pattern is preferred for this purpose as it has been determined to be most robust, although other patterns can be used. If the symbol is found to be a 1-D barcode, the scan pattern is increased in size (opened) to a maximum size, at a prescribed rate, in conformance with the portion of the symbol previously decoded, and the rotating Lissajous pattern decodes the entire symbol. If the symbol is determined to be a 2-D barcode, the rotating Lissajous pattern is converted to a raster pattern, and increased in size at a prescribed rate to decode the barcode. In a preferred embodiment, the raster pattern precesses so as to align with the 2-D symbol and therefore read 2-D barcodes of different angular orientations with respect to the horizontal scanning pattern.

Figure 1B:
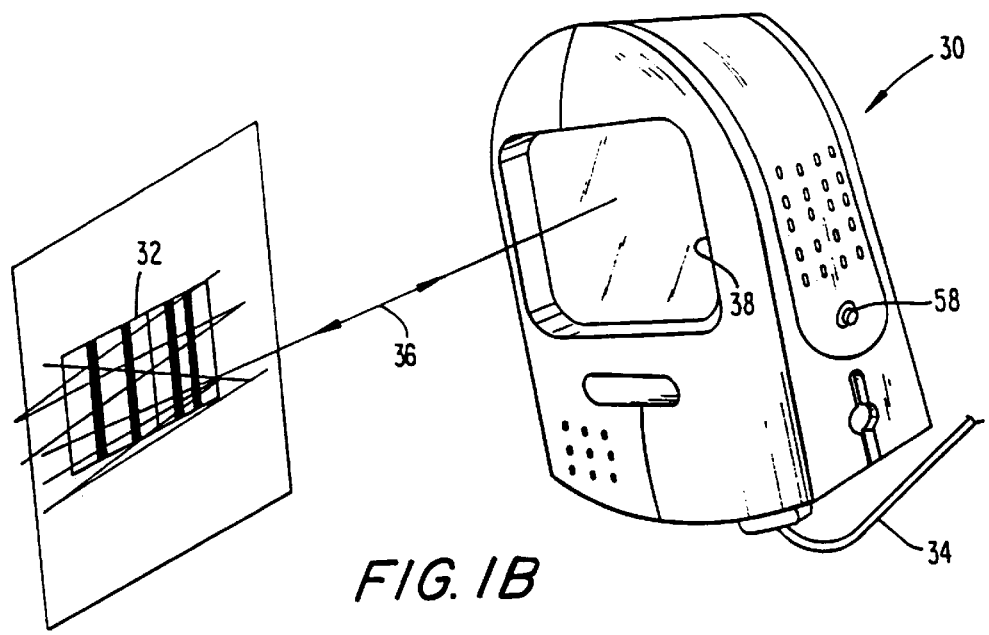
FIG. 1B is a perspective views of a "palm-held" scanner, in accordance with one aspect of the invention
Figure 1C:
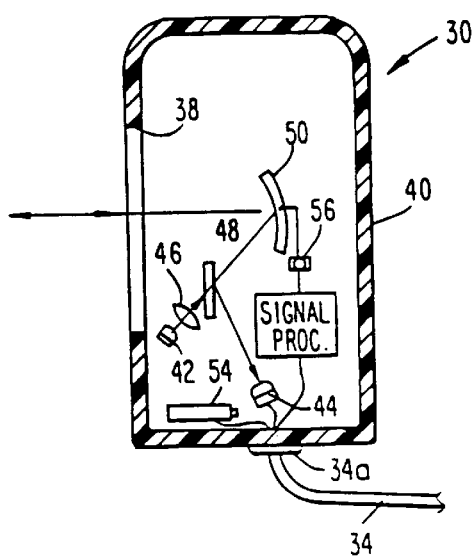
FIG. 1C is a side view of the palm-held scanner in cross-section.

Thus, referring to FIG. 1A, a hand-held barcode scanner 30 is confined to be held in the palm of a user's hand and oriented in the direction of a barcode or other symbol 32 to be read. The scanner 30 is housed in a light-weight plastic housing 40 (FIG. 1B) containing a semiconductor laser light source 42, photodetector 44, optics 46, 48 and 50 and signal processing/control circuitry 52. Alternatively, the housing may be gun-shaped and provided with handle to enable the user to easily manually aim and shoot the light beam toward a symbol which may be remote from the housing, and an indicator which may be an audio source inside the housing to inform the user that the housing is positioned in the correct working range for reading bar code symbols. Such a housing is shown in FIG. 1 of U.S. Pat. No. 5,168,149, incorporated herein by reference. The circuitry in housing 40 may be powered by connection to a power source, or by batteries 54 to allow the unit to operate in a portable, wireless iode.

As further depicted in FIGS. 1A and 1B, a suitable lens 38, or multiple lens system, will focus the scanned beam onto the barcode symbol at an appropriate reference frame. The light source 42 is positioned to introduce a light beam into the axis of the lens 38, and the beam passes through a partially silvered mirror 48 and other lenses or beam-shaping structure as needed. An oscillating mirror 50 is connected to a scanning motor 56 that is driven by the control circuitry 52 in response to manual operation of a trigger 58 on the outside of the housing 40 (FIG. 1A). Signals to and from the control and signal processing circuitry 52 are carried by exit port 34a and line 34 to external equipment.

The scanner 30 may be adapted to scan different types of articles or for different applications by interchanging the scanning head with another through use of electrical connectors. Furthermore, the scanning module may be implemented within a self-contained data acquisition system including one or more such components as keyboard, display, printer, data storage, application software and data bases (see, for example, U.S. Pat. No. 4,409,470), and may also include a radio or other type of communications interface for communication with a local area network, telephone exchange network or radio broadcast system.

Referring to FIG. 26A, the palm scanner module 30, now shown in more detail, incorporates a rubber grip 110 around the crown of the module slightly above a pair of indentations 112 for seating the module in a mounting bracket 114, enabling the module to pivot about a horizontal axis. The bracket 114 includes a pair of upstanding supports 116 having spindles 118 for rotatably supporting the module. The bracket 114 in turn is mounted on a base 120 that is turreted to a mounting plate 122 and hence is able to rotate about a vertical axis. The scanner module 30 can be easily removed from the bracket by lifting with a force sufficient to enable the spindles 118 to slip from the indentations 112.

Figure 2A:
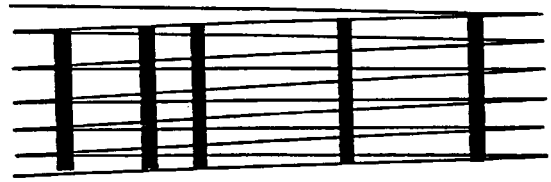
FIG. 2A shows raster scanning of a 1-D barcode pattern.
Figure 2B:
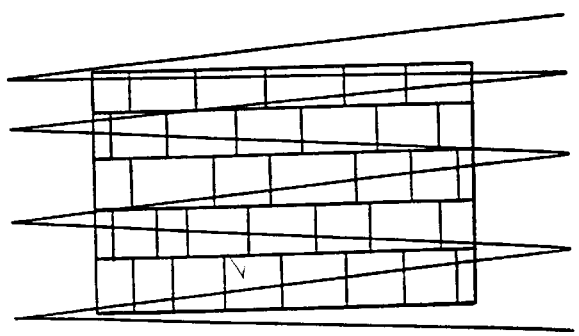
FIG. 2B shows scanning of a 2-D, or PDF, barcode pattern.

The outgoing beam 36 is generated in the scanner 30 by a laser diode or the like, and directed to impinge upon the barcode symbol 32 that ordinarily is positioned a few inches from the front of the scanner. However, other applications may require scanning a target that is at a considerable distance e.g., 60 feet from the scanner. The outgoing beam 36 is scanned using various patterns to be described later, one being a linear raster as shown in FIGS. 2A and 2B. The user positions the hand-held unit so that the scan pattern traverses the symbol to be read. Light reflected from the symbol is received by the unit 30 and detected by a photo-detector 44 within the housing. Light beam 36, in both directions, passes through a transparent or translucent window 38 that preferably is approximately square in shape to accommodate 2-D as well as 1-D pattern scanning.

Referring to FIG. 2A in more detail, a raster scanning pattern, known in the art, is traversing a 1-D barcode. Such a scan pattern may be generated by vertical (or Y-direction) displacement of a linear scan line driven in the X-direction, such as described in U.S. Pat. No. 4,387,297. Although numerous scan lines traverse the barcode, only one line of scan is necessary for proper decoding since the additional scan lines are redundant and only re-read the same data on a different vertical position of the barcode symbol. In FIG. 2B, the raster traverses a 2-D barcode, and is opened vertically to encompass the barcode entirely. Although the 2-D pattern contains many rows of optical elements, it is necessary only that each row be traversed once, as shown, for decoding.

Figure 3A:
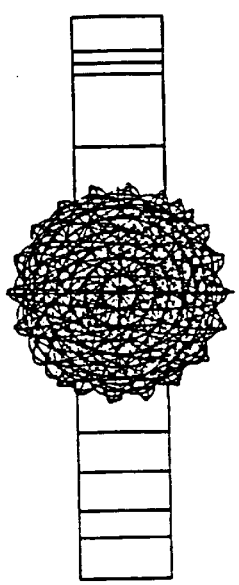
FIG. 3A shows a relatively small pattern in scanning a portion of a 1-D barcode for aiming.
Figure 5A:
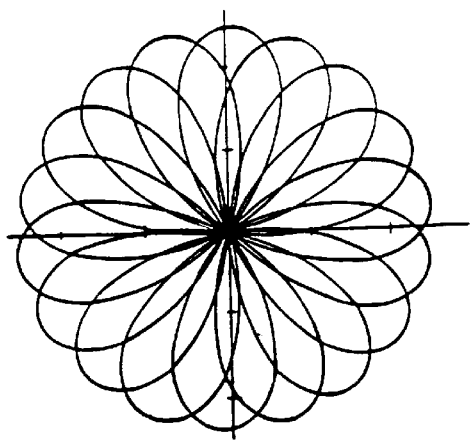
FIGS. 5A and 5B show rosette patterns of different density for aiming.
Figure 5B:
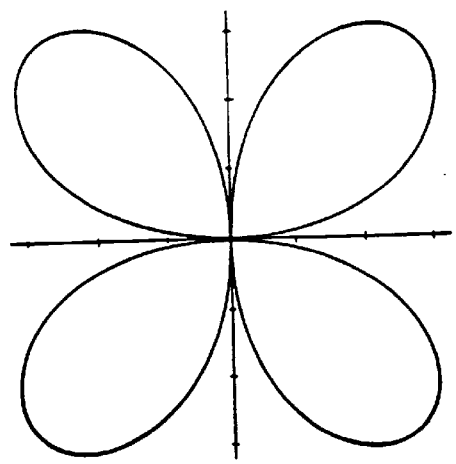
Figure 5C:
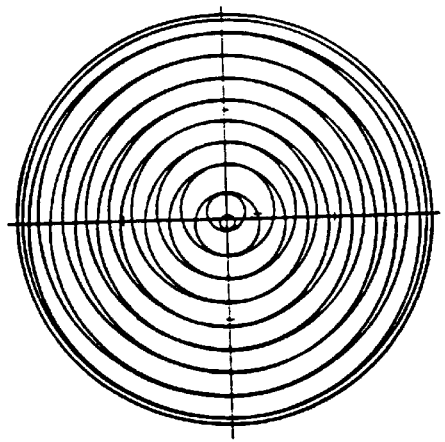
FIG. 5C shows a spiral pattern and FIG. 5D shows a stationary Lissajous pattern.
Figure 5D:
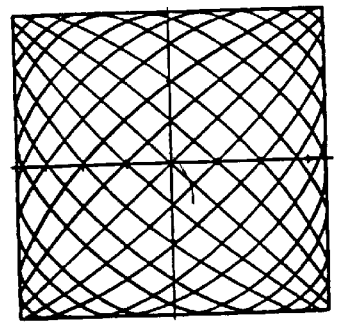

For long range scanning, first aiming and then scanning the barcode to read the code is natural. These operations are termed the "aim mode" and "decode mode" hereinafter. Two trigger pull positions are normally provided, or the trigger is pulled twice to produce these respective modes of operation. In accordance with one aspect of the invention, and referring to FIGS. 3A and 3B, upon a first pull of the trigger 58, a bright spot for aiming is used to establish a small visible pattern on the target surface. This technique is similar to that disclosed in U.S. Pat. No. 5,117,098 of Swartz and assigned to the assignee of this invention. This visible pattern may be produced by a small scan line, but preferably is presented in the form of a bright spot. This "spot" can be developed, and is presented in most visible form, by an oscillating circle, or spiral, pattern shown in FIG. 5C. Other patterns found suitable for aiming are rosette (FIGS. 5A and 5B), stationary Lissajous (FIG. 5D), rotating line (FIG. 5E) and rotating Lissajous (FIG. 6).

Figure 5E:
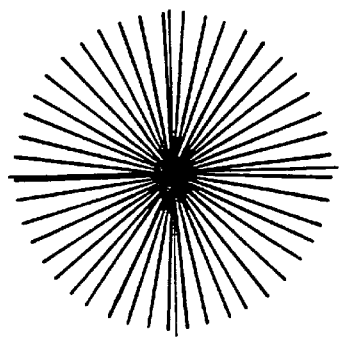
FIG. 5E shows a rotating line pattern for aiming with automatic scan alignment.
Figure 6:
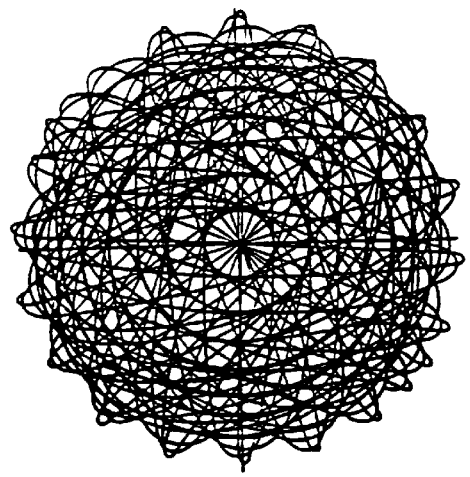
FIG. 6 shows a rotating Lissajous pattern for aiming on and decoding 1-D barcodes.

For example, the line scan pattern of FIG. 5E is produced by generating a beam of a relatively short line scan pattern, and rotating the pattern quickly about its center once or after every few scans. Alternatively, the scan line may be randomly positioned at pre-determined angles, once or after every few scans, and the angle of rotation about its center of rotation may be controlled in response to signals read produced by light reflected from the symbol. Assuming that the spot is located in nearly the center of the barcode, the orientation of the barcode may be estimated using a peak detector, to be described later, if the barcode is a 1-D barcode or the orientation may be estimated from the returned digital bar pattern, or DBP, as the scan line is positioned at different angles.

Figure 3B:
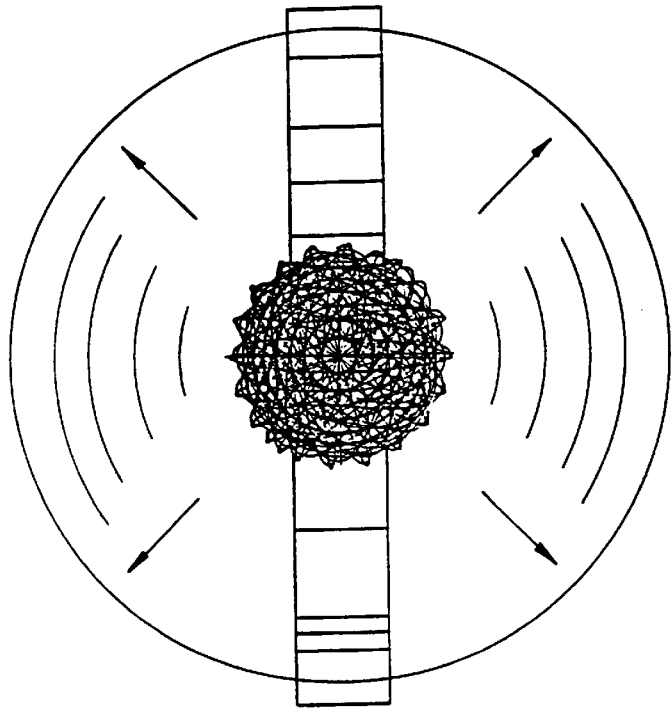
FIG. 3B depicts expansion of the scan pattern to decode the entire barcode.

Upon the second trigger pull (or further pull of the trigger in the same stroke if the trigger is multi-purpose), or automatically, in the decode mode of operation, the scan pattern opens in the exact orientation of the barcode as determined by the peak detector, as shown in FIG. 3B, so that the entire barcode will be decoded. The ultimate size of the rotating scan line pattern, and the rate at which the pattern opens, is controlled dependent upon barcode attributes, such as type, aspect ratio and size, decoded during the aim mode. Optionally, the barcode may be completely decoded during the aim mode, and if so, a consistency check may be performed during the decoding mode.

The following example assumes an aim pattern in the form of a single scan line, FIG. 5E, a pattern particularly useful for discerning the orientation of a barcode prior to decoding. In order to rotate a single scan line, or position it at any given angle, an element having two degrees of freedom with equal resonant frequencies on both axes is necessary. The horizontal and vertical oscillations are given by $\hat{X}(t)=\sin(wt)\cos(\theta)$ $\hat{Y}(t)=\sin(wt)\sin(\theta)$ where θ is the angle of rotation with respect to the x-axis. This angle will normally be produced in the form of a digital quantity presented to the rotation system via a microprocessor system. The resonant frequency w should be chosen high enough so that a possible loss in aggressiveness during the angle estimation/aiming period is not apparent.

In order to cover all possible orientations of the barcode, the scan lines must be capable of rotating through 180 degrees, and preferably the entire symbol will be covered such that at least two scan lines traverse each row of bar patterns during reading. However, the resolution of rotation depends on the aspect ratio and size of the barcode.

If it is necessary to rotate the scan line once every s scans, at a resolution of r degrees, for a duration of d seconds in order to cover a total of 180 degrees, then $$w = \frac{180\pi s}{rd}$$

is selected.

For example, if a complete 180 degree rotation should be accomplished within 0.1 second, at 10 degree resolution for every scan, then w/2π=90 Hz will suffice.

Referring to FIGS. 10–12, means for detecting when the scan line of FIG. 5E is aligned to a barcode are shown. In FIGS. 10A and 10B, the barcodes and scan line are in alignment and out of alignment, respectively. The DBP (digital bar pattern) stream corresponding to the scanned barcode is analyzed to find the scan angle at which the energy content of the DBP stream is maximum because the scan line has intersected the most barcode elements. In FIG. 10A, the DBP pattern scanned by line 75a has more elements than that of FIG. 10B where the barcode has been scanned by a skewed scan line 75b. As the scan line is rotated, the number of elements produced In the DBP stream is estimated by filtering and comparing with the stream produced by other scan line angles. Hence, referring to FIG. 11, the DBP stream is read and supplied as an analog signal (a) derived from the DBP stream to a high pass filter 70 which produces waveform (b). A peak level detector 72 tracks the peak value or envelope of the filtered replication of the DBP stream (see waveform (c)), and the peak value is compared to a prescribed threshold (e) by comparator 74. The points at which the envelope and threshold intersect each other develop an output signal (e) having a duration that corresponds to the number of DBP elements spanned by the scan line. The duration of the output signal is measured by timer 76, to indicate the number of elements of the DBP stream, and the scan line producing a DBP stream of greatest duration is identified as having the best alignment to the barcode.

The orientation of the scan line alternatively may be determined more precisely than what is capable using the circuit of FIG. 12 by implementing an algorithm wherein the DBP stream is read and scanned for regions bound by a known scan direction synchronizing signal (called "SOS") having the most elements. For example, the orientations between five and ten degrees may have one hundred elements, while all others have fewer. If the scan line is shorter than the barcode, then this region between five and ten degrees, for example, will indicate the general barcode orientation. A more exact orientation can be found by rotating the scan line in a direction that minimizes the total sum of these element widths. Once the exact orientation is found, the scan line length may be increased until a decode occurs. Hence, this approach represents a global search for general barcode orientation, and then a fine tuning step.

The circuit of FIG. 12 is more immune than the algorithmic approach, as the threshold of comparator 74 may be set to ignore spurious elements due to noise.

Although the short single line pattern is the most visible, it is disadvantageous for aiming because it suggests orientation and may be psychologically distracting. Larger spots, those shown in FIGS. 5A–D, can be simulated without changing the aperture by creating the spiral pattern shown in FIG. 5A, implemented by modulating the size of a circle pattern. As mentioned previously, a spiral is the most visible, non-orientation, suggestive and easily implemented. All of the aim patterns of FIGS. 5A–D can be created by the circuit shown symbolically in FIG. 8, which implements the following equations:

$$x(t)=\sin(w_2 t)A(t) \qquad (1)$$

$$y(t)=\cos(w_1 t)A(t) \qquad (2)$$

The function $A(t)$ can be arbitrarily picked. For example, let $A(t)=\sin(w_3 t)$. The rosette pattern of FIG. 5A is created with $w_1=w_2$, and $w_3=4w_2$; the rosette pattern of FIG. 5B is created with $w_1=w_2$, and $w_3=2w_2$; the spiral pattern of FIG. 5C is created with $w_1=w_2$, and $A(t)=|\sin(w_2/50)|$; and the stationary Lissajous pattern of FIG. 5D is created with $w_1=w_2/1.1$, and $A(t)=1$. The rotating line pattern, FIG. 5E, is created by having the modulating function $A(t)=\sin(w_{scan}t)$ and $w_1 t=w_2 t=\theta$ where $\theta$ is the angle of the scan line, and $w/2\pi$ is the scanning frequency.

Another pattern which may be used for aiming, and which will be described in more detail later, is the rotating Lissajous pattern shown in FIG. 6. The rotating Lissajous pattern is somewhat inferior for aiming because its visibility is less pronounced than other patterns, but is particularly advantageous insofar as its ability to decode during aiming is the most robust of all the patterns considered.

Another pattern for aiming found particularly effective is a bright rosette pattern of diameter less than the diameter of rosette to be used for decoding.

Once satisfied with aiming, the scanner begins to deflect the light beam with a scan pattern appropriate for decoding the barcode. The scan pattern for decode may be the same as for aim, or may be a different pattern or may be the same or different pattern with center of rotation that shifts upon transition between the two modes or during decoding. In a preferred embodiment, the decode scan pattern which is generated depends upon whether the barcode is found to be a 1-D barcode (when the preferred decode pattern is omnidirectional) or a 2-D barcode (when the preferred decode pattern is raster). Pattern switching may be responsive to a second trigger pull, or may occur automatically.

Figure 4A:
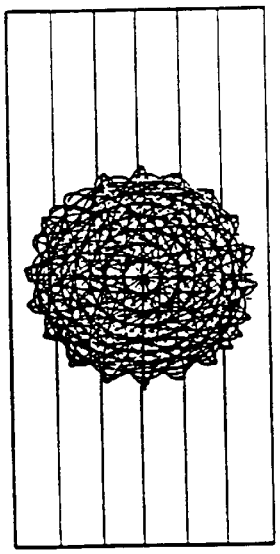
FIG. 4A shows a 2-D barcode, scanned by a relatively small, rotating Lissajous pattern for aiming.

For example, referring to FIG. 4A, it is assumed that a rotating Lissajous aiming pattern is directed toward a target having a 2-D barcode, as shown. The barcode is partially decoded to determine barcode type and orientation. The first row of the barcode may be decoded to determine whether the barcode is a 1-D or 2-D barcode. Alternatively, an algorithm may be used that is capable of determining whether the portion read is a portion of a 1-D or 2-D barcode on the basis of code words detected and decoded.

Figure 4B:
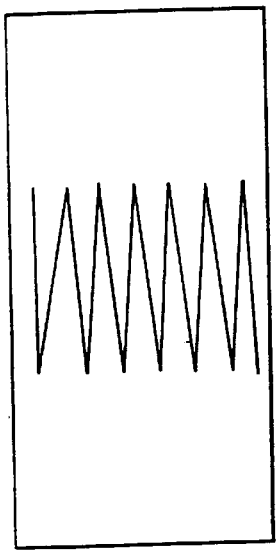
in FIG. 4B, the pattern has transitioned to a raster pattern suitable for 2-D barcode decoding; and in FIG. 4C, the raster is enlarged to decode the complete barcode.

Upon determining, in this example, that the barcode is a 2-D barcode, the scan pattern is changed to a raster pattern, as shown in FIG. 4B, necessary for scanning such barcodes. Based upon data read from the barcode during the aim mode, the width of the scanning pattern is opened until it at least spans the width of the barcode, and the height is incremented until the entire barcode is decoded. As the scanning pattern is increased in height, the barcode rows encompassed by the scanning pattern will be read, decoded and interpreted to determine whether an entire 2-D barcode symbol has been scanned, as described in U.S. Pat. No. 5,235,167. Each row the bar code will preferably be traversed by at least two scan lines, although only one traversal is necessary. Once the symbol is read, feedback to the user in the form of, for example, an audio tone, may be presented by the control/processing circuitry within the bar code reader.

Preferably, the specific pattern produced by the scanner, in accordance with an important aspect of the invention, is a pattern that is optimized for a particular classification of indicia and depending on whether the scanner is operating in a portable mode or is mounted in its fixture. A scan pattern is deemed to be optimized if it reads and decodes a prescribed pattern in a minimum amount of time, and within reasonable economic constraints.

If the scanner is operated in the fixed mode, with the palm held module 30 is mounted in bracket 114 and the module 30 directed to a region across which items bearing indicia, such as a barcode, to be read are passed, the rotational orientation of the scan pattern with respect to barcode is indeterminate. On the other hand, if the scanner is operated in the aim and shoot mode, with the module 30 separated from the bracket, the scanning pattern may be manually aligned with the barcode. The specific pattern produced should be optimized for decoding barcodes of the particular classification of barcode being read.

Figure 27:
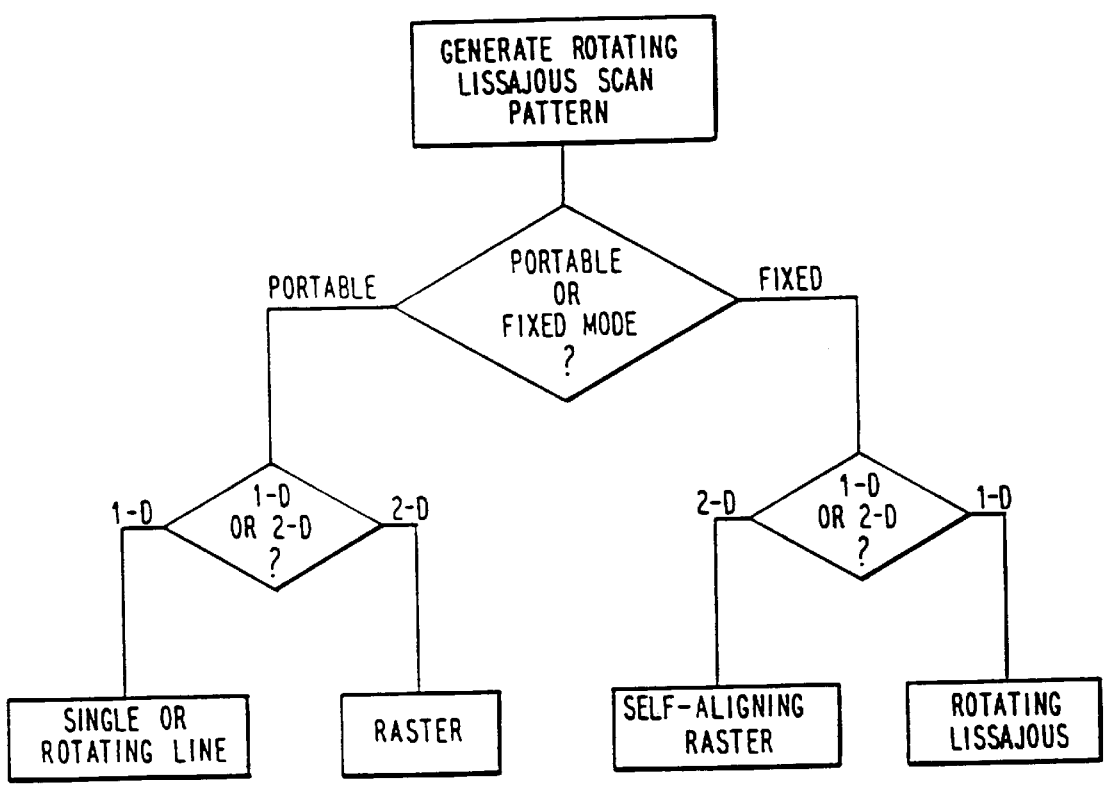
FIG. 27 is a chart for explaining the operation of the scanner in portable and fixed modes for 1-D and 2-D barcode patterns.

Hence, in accordance with an aspect of the invention, and referring to FIG. 27, a suitable scan pattern is produced for determining classification of the symbol to be read, e.g., whether the symbol is a 1-D or 2-D barcode. In the example shown, a rotating Lissajous scanning pattern is selected for its omnidirectionality and robust decoding ability. At the same time, it is determined whether the scanner is in the portable mode or fixed mode of operation (the order of sequence of the first two steps is arbitrary). This may be carried out by detecting the presence of the module 30 in bracket 114 by means of, e.g., a mechanical or magnetic proximity switch in the base of the fixture (not shown in FIGS. 26A, 26B; however, see U.S. application Ser. No. 08/028,107, filed Mar. 8, 1993, incorporated herein by reference), or by a manual switch located on module 30 or elsewhere.

Assume first that the scanner is in the fixed mode of operation and arranged to read a barcode symbol. The symbol is preliminarily read using the rotating Lissajous scan pattern to detect the start and stop codes of the barcode, so as to determine whether it is a 1-D or 2-D barcode. If the symbol being scanned is determined to be a 1-D barcode, the scanning pattern will remain defaulted in the form of a rotating Lissajous pattern, as shown in FIG. 27, a pattern that has been determined in accordance with the invention to be optimized for 1-D barcodes. If the symbol in determined to be a 2-D barcode, on the other hand, the scanning pattern is changed to a self-aligning raster, as also shown in FIG. 27. (A self-aligning raster is a raster that rotates or precesses so as to traverse a 2-D barcode and read it independently of the rotational orientation of the barcode. A specific embodiment of self-aligning raster is a precessing raster described in more detail later with reference to FIG. 7.)

Still referring to FIG. 27, when the scanner is determined to be operating in the portable mode, and the symbol as read during Lissajous scanning is determined to be a 2-D barcode, the scanner produces a raster type scanning pattern. This raster is preferably stationary, but may be enhanced to precess or rotate so as to read barcode symbols of diverse rotational orientations. On the other hand, if the symbol is determined to be a 1-D barcode symbol, scanning is continued in the form of a pattern optimized to read such barcodes, such as a single or rotating scan line, or rotating Lissajous.

The particular scanning patterns produced for decoding 1-D or 2-D barcodes when the scanner is operated in portable and fixed modes can be varied for specific applications and modules of particular optical characteristics. What is important is that the scanner is adaptive, controlled manually but preferably automatically, to produce decoding scan patterns that are optimized, that is, as robust as practical with respect to the operating mode selected and the classification of indicia being read.

Preferably, the scan pattern is also optimized in dependency on whether scanning is carried out by a presentation type (under a scan lamp) or a pass through (supermarket) type reader. In the presentation type reader, an article carrying a barcode or other symbol to be read is brought to the reader or the reader is brought to the article. Since reading is carried out in very close proximity to the barcode, there is no need for aiming. In the pass through reader, the article bearing a barcode is swiped past a scanning pattern produced by a fixed source of light beams. These two modalities present different decoding requirements to barcode readers (in the pass through mode of reading, the article swipes through the scan region relatively quickly, whereas in the presentation mode, the barcode is relatively stationary when read). Hence, if reading is carried out in the pass through mode, and the barcode is not very truncated (that is, the barcode is thin), a scanning pattern producing lines that are more sparsely spaced but more often repeated is preferred because it is more likely to traverse the barcode. That is, the faster the swipe, the thicker the barcode should be and hence a scanning pattern, such as a rotating Lissajous pattern, optimized for a relatively thick barcode pattern is preferred.

Figure 4C:
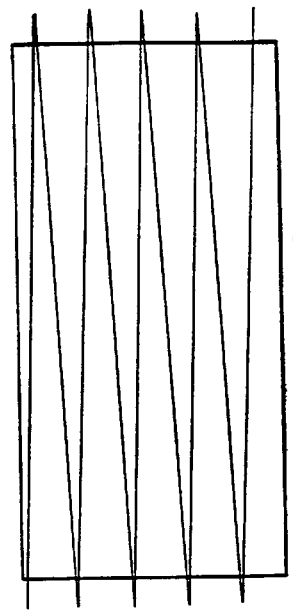

Assuming now that the rotating Lissajous pattern is generated (FIG. 4A) for aiming, in aim and shoot scanning. Another important aspect of the present invention is that the rate of increase of the size of the raster in moving from FIG. 4B to FIG. 4C is responsively controlled depending upon the size and nature of the barcode. The rate at which the scan pattern opens may be controlled to be faster for larger barcodes. The size of each increment may be dependent upon the working range of the scanner. For example, very long range scanners, e.g., up to about 60 feet, may require smaller increments so that the patterns do not grown too fast at the end of the working range.

The preferred Lissajous pattern for decoding, shown in FIG. 6, is preferably of frequency ratio x/y ranging from 1.1 and 1.3 and rotated at a rate of between 1 to 4 degrees per scan. These numbers are found optimal for scanning highly truncated 1-D barcodes. In this respect, the rotating Lissajous pattern, with its sequence of scanning patterns that are successively rationally offset, has been found more robust for decoding than a stationary Lissajous pattern. The optimal stationary Lissajous pattern is at a frequency ratio 0.7. However, the optimized rotating Lissajous pattern produces a 17% improvement in decoding efficiency over the stationary Lissajous pattern. When the rotating Lissajous pattern is converted to a raster for scanning 2-D barcodes in omnidirection, the frequency ratio is made higher by increasing the slower scan frequency y.

Figure 8:
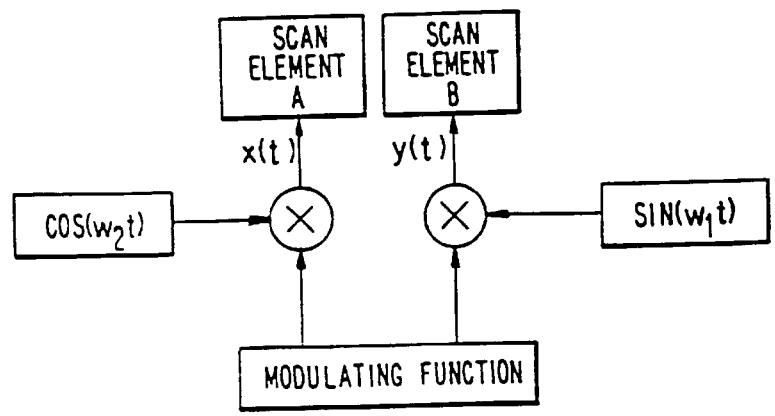
FIG. 8 is a simplified block diagram of circuitry for producing aim and rotating line scan patterns.
Figure 13:
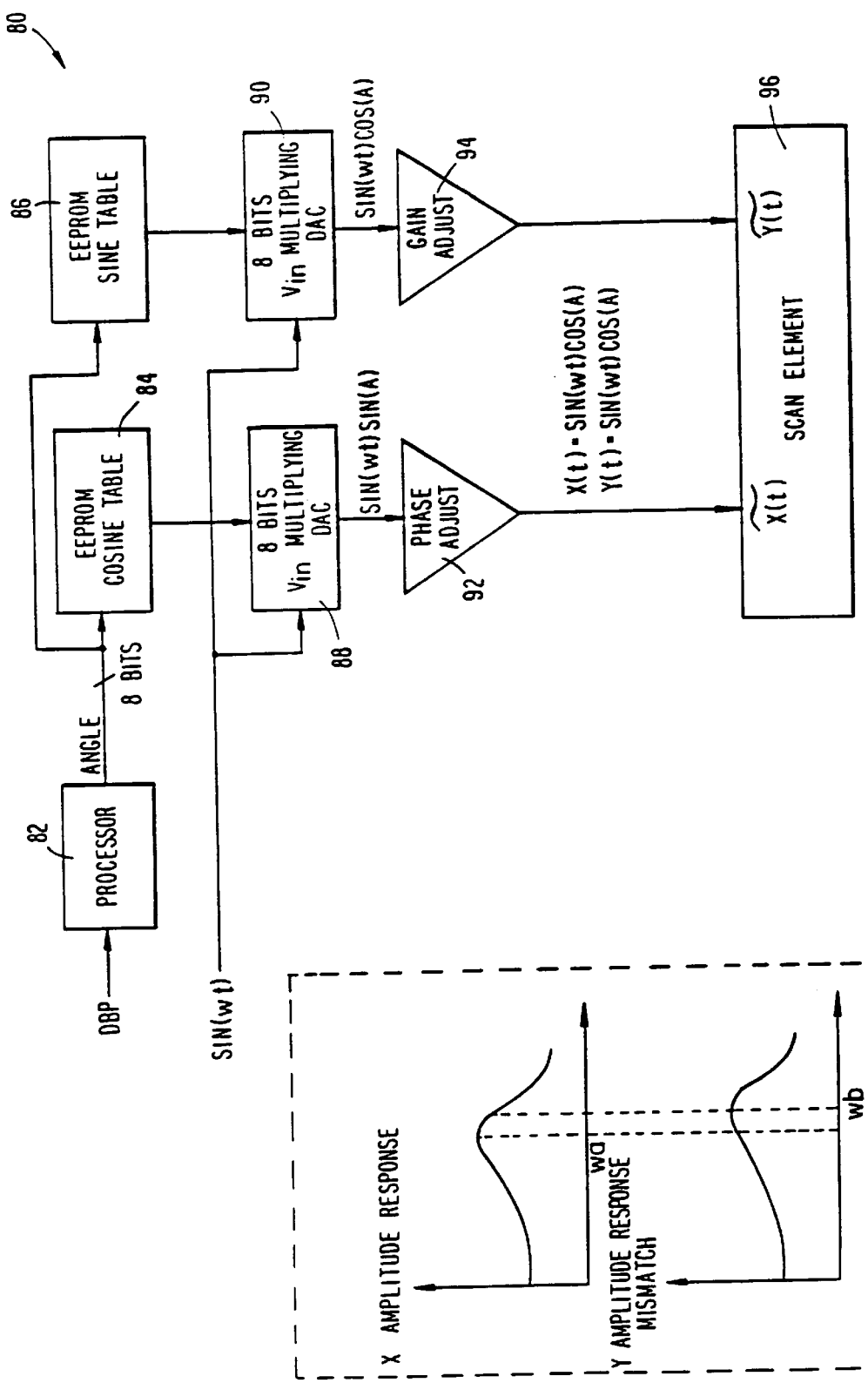
FIG. 13A is a block diagram of circuitry for driving scan elements for single line rotation and scanning.
FIG. 13B shows amplitude responses of a typical resonant scan element.

Single line rotation and scanning is produced, in accordance with the invention, by driving two mirrors (not shown) using the circuit 80 of FIG. 13A which corresponds to, but is more detailed than, FIG. 8. The two mirrors are mounted on resonant scan elements having relative resonant frequencies at wa and wb, respectively, shown in FIG. 13B. To implement oscillation of the two mirrors for scanning in X- and Y-directions, satisfying the relationships given in equations (1) and (2), the circuit 80 implements a processor 82 that estimates the orientation of the barcode based on element counts in the DBP stream and/or start and stop character detection. A scan line will be opened upon the second trigger pull at an angle based on the last detected barcode orientation. The processor 82 addresses EEPROM cosine and sine tables 84 and 86 which generate digital data corresponding to amplitudes of the cosine and sine of the prescribed angles. These digital signals are multiplied by sin(wt), and the product converted to a corresponding analog signal in multiplying digital-to-analog converters (DAC) 88 and 90.

Amplitude control shown herein assumes that the Y-element will be driven somewhat harder than the X-element so as to compensate for any slightly leading resonant peak, as depicted in the amplitude response curves of FIG. 13B. Similar compensation may have to be carried out to equalize the phase responses. Here, it is assumed that the X-element is lending in phase. The phase adjustment is performed by phase adjustment circuits 92 and 94. The outputs of the phase adjustments 92, 94 are supplied to the X- and Y-inputs of resonant scan elements 96.

Resonant scan elements are known in the art. Such elements typically are provided with a flexural strip of Mylar or other material cantilever mounted to a base and supporting a miniature permanent magnet positioned within a coil. The coil is secured to a base, and a scan mirror is attached to the free end of the cantilever mounted flexural strip. By changing the dimensions or flexural characteristics of the cantilever mounted strip, the mass of the strip, the permanent magnet and mirror, or the distribution of mass on the flexural strip, different resonant frequencies can be established. See, for examples copending application Ser. No. 07/884,738, filed May 15, 1992 and incorporated herein by reference.

The resonant scan element can also be presented as a single element having different resonant frequencies in mutually orthogonal directions, and utilizing a single mirror to perform single line rotation and scanning. The circuit 80 of FIG. 13A can be implemented to apply drive signals for X- and Y-scanning to the two inputs of the dual-resonance scanning element, as disclosed in the copending application.

To produce 2-D scanning patterns for symbologies such as PDF 417, described in U.S. patent application Ser. No. 07/461,881, filed Jan. 5, 1990, the resonant scan element must be capable of being simultaneously driven by at least two frequency components. Raster pattern rotation is achieved by driving a 2-D scanner such that the horizontal element is driven with the signal X(t) and the vertical element is driven with the signal Y(t), where $$X(t)=\sin(w_1 t)\cos(\theta)-\sin(w_2 t)\sin(\theta) \qquad (3)$$

$$Y(t)=\sin(w_1 t)\sin(\theta)-\sin(w_2 t)\cos(\theta) \qquad (4)$$

and θ is the angle of rotation in digital form.

Figure 16:
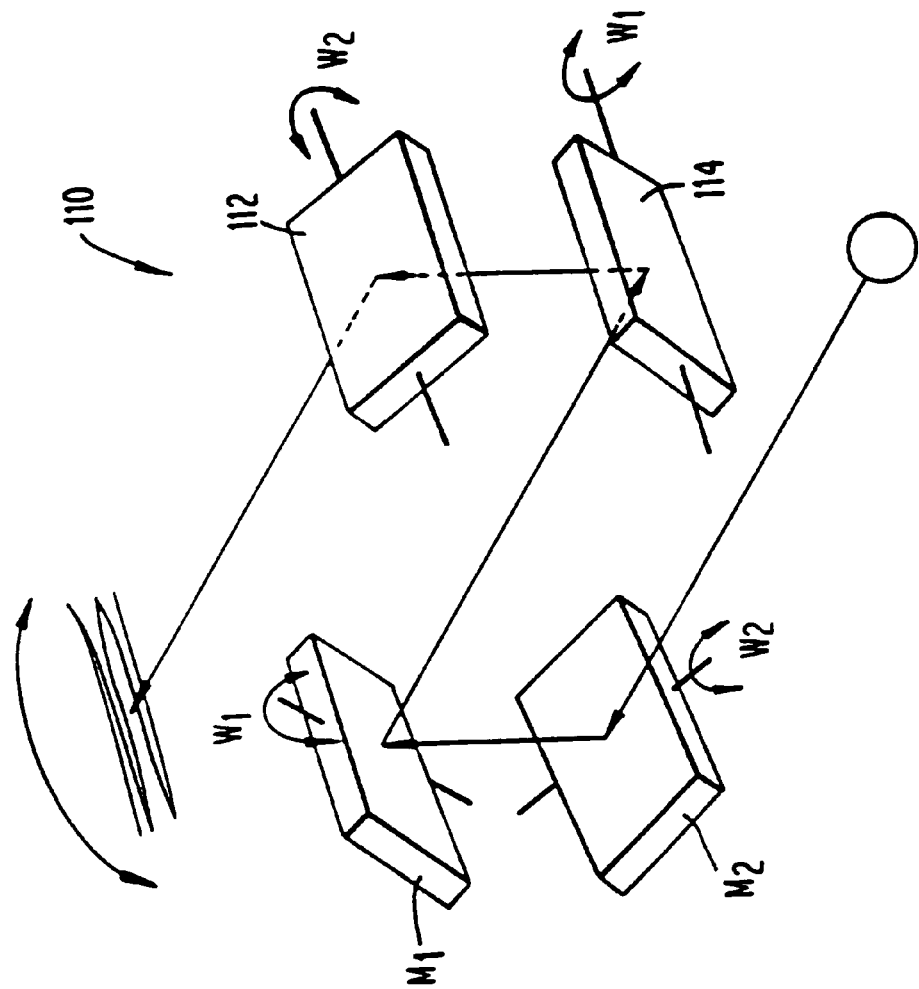
FIG. 16 is a perspective view of a rotating Lissajous scanner embodiment, implemented by four reflectors.

The above equations describe a rotating Lissajous pattern, and in fact, any Lissajous pattern may be rotated if the two sine functions are replaced by their Lissajous equivalent. If the resonant scan element has the desired equal amplitude and phase responsive at the two sinusoidal components of each drive axis, as illustrated in FIG. 16 depicting the frequency response shapes of resonant scan elements for 2-D scanning, then no added compensation for phase and amplitude is required.

A circuit 98 for developing drive signals for Lisajous pattern rotation, shown in FIG. 14 and described by equations (3) and (4), comprises a processor 100 addressing sine and cosine EEPROM tables 102 and 104 that produce the sine and cosine values of the angle, in digital form, generated by the processor. These sine and cosine digital values are supplied to multiplying DAC units 106 to produce the analog sine and cosine functions of the above equations.

The four drive signals produced by circuit 98 of FIG. 14 may be applied to four resonant elements supporting four reflectors, each oscillating at a single resonant frequency, as shown in FIG. 17 and identified by numeral 110.

Figure 15:
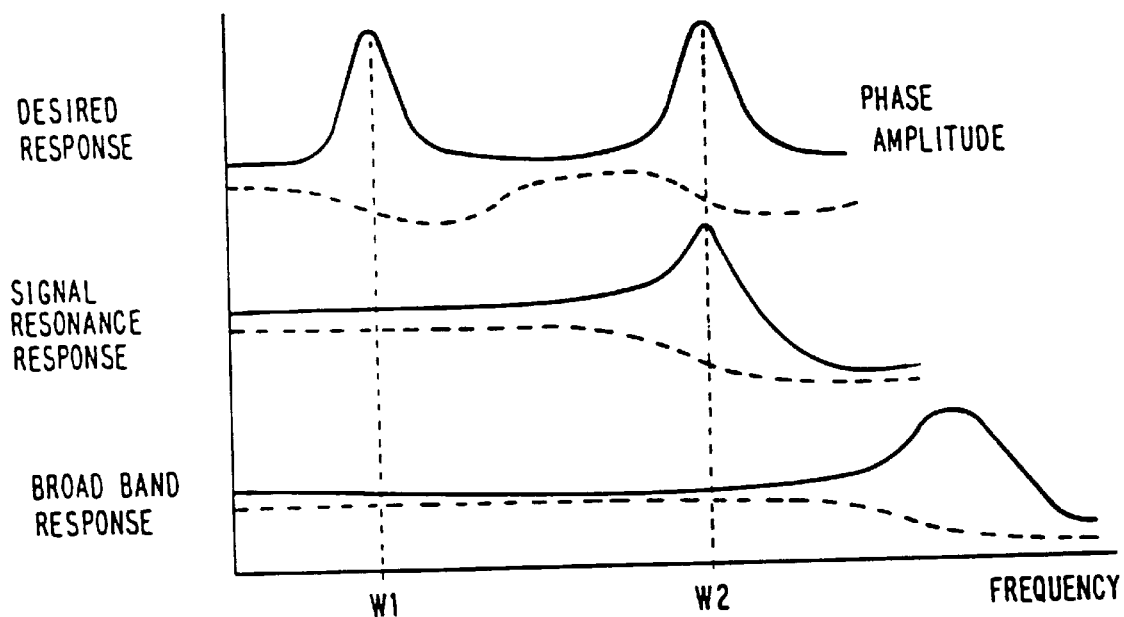
FIG. 15 depicts the amplitude and phase responses of resonant elements used for producing a rotating Lissajous scan pattern, in accordance with the invention.

A first pair 112, 114 of the mirrors 110 is optically combined as X-axis elements having two resonant frequencies. The second pair is arranged as a Y-axis element having two resonant frequencies that match those of the first pair. The mirrors may be oriented in either of the configurations of FIGS. 15A and 15B.

Alternatively, each mirror pair may be combined on a single resonant element wherein a distinct resonant peak is available for each axis. The element hence can be driven at its resonance frequency by the higher frequency w2 and off resonance by the lower frequency w1, but with a larger amplitude and any necessary phase compensation. Resonance elements of dual resonant frequency response may be arranged orthogonally to produce the rotatable raster patterns in this case.

Figure 9A:
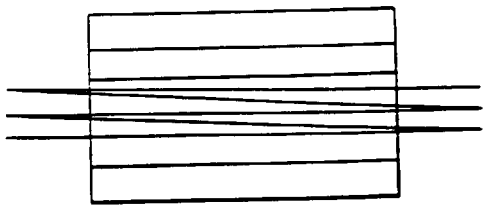
FIG. 9A depicts a raster pattern scanning a 2-D barcode.
Figure 9D:
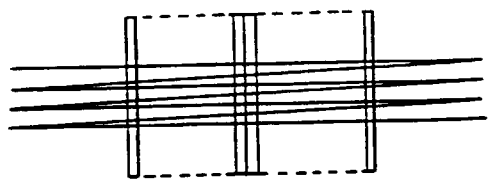
FIGS. 9D–9F present the same scan patterns to a 1-D barcode.
Figure 9B:
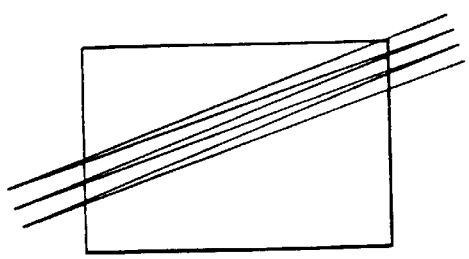
in FIG. 9B, the scan pattern is horizontally misoriented with respect to the barcode; and in FIG. 9C, the scan pattern contains a degree of droop.
Figure 9E:
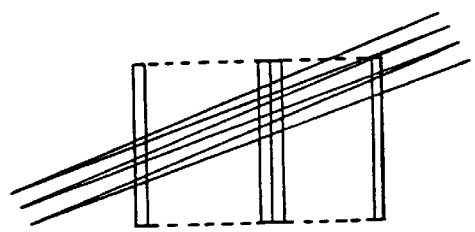
Figure 9C:
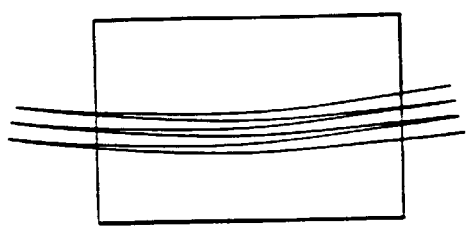
Figure 9F:
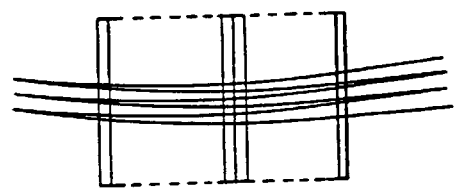

FIGS. 9A–9D are raster patterns scanning 2-D and 1-D barcodes, respectively, in perfect alignment. However, in practice since the orientation of the scan pattern will not be in perfect alignment with the barcode; scanning typically will be somewhat skewed as shown in FIGS. 9B and 9E. Furthermore, since 2-D scanning mechanisms tend to be slightly non-linear and will ordinarily produce a somewhat arcuate, or drooped, scan pattern as shown in FIGS. 9C and 9F, decoding of the barcode is somewhat difficult to achieve when a complete row of barcode is not entirely scanned.

Figure 7:
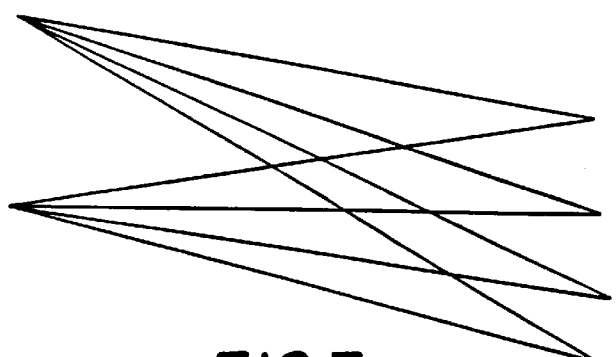
FIG. 7 shows a precessing raster scan pattern for decoding 2-D barcodes of various orientations.

To compensate for rotational misalignment between the scan pattern and barcode, or droop in the scan pattern, another aspect of the invention precesses the raster so as to traverse barcode elements that are angularly displaced or are not oriented along a straight line. Referring to FIG. 7, the angle of sweep of each line by the raster scanner is staggered or precessed slightly, so that the light beam sweeps across the barcodes in a zig-zag pattern. Precession whereby subsequent scanning patterns are rotationally offset from a previous pattern, occurs when the ratio of the X component to the Y component of the scanning pattern is not an integer. In the preferred embodiment, the scan ratio is 1.75:1. For example, if the X component frequency is 120 scans per second, then the Y component frequency is 68.5 scans per second (120 divided by 1.75). The scanner can be designed such that the scan ratio is always 1.75:1, although precession alternatively can be achieved by activating the Y frequency scan by a computer driver. Preferably, each row of the bar code will be traversed by two lines of scan, although only a single scan line per row is necessary.

The resultant zig-zag pattern causes the light beam to sweep the barcode symbols in a plurality of different angles, so that angularly offset lines of barcode up to about thirty degrees of offset can be read by the raster during precession. Similarly, even if the beam emitted by the scanner contains a degree of droop, the precessing raster will scan every barcode line during successive frames.

Figure 18:
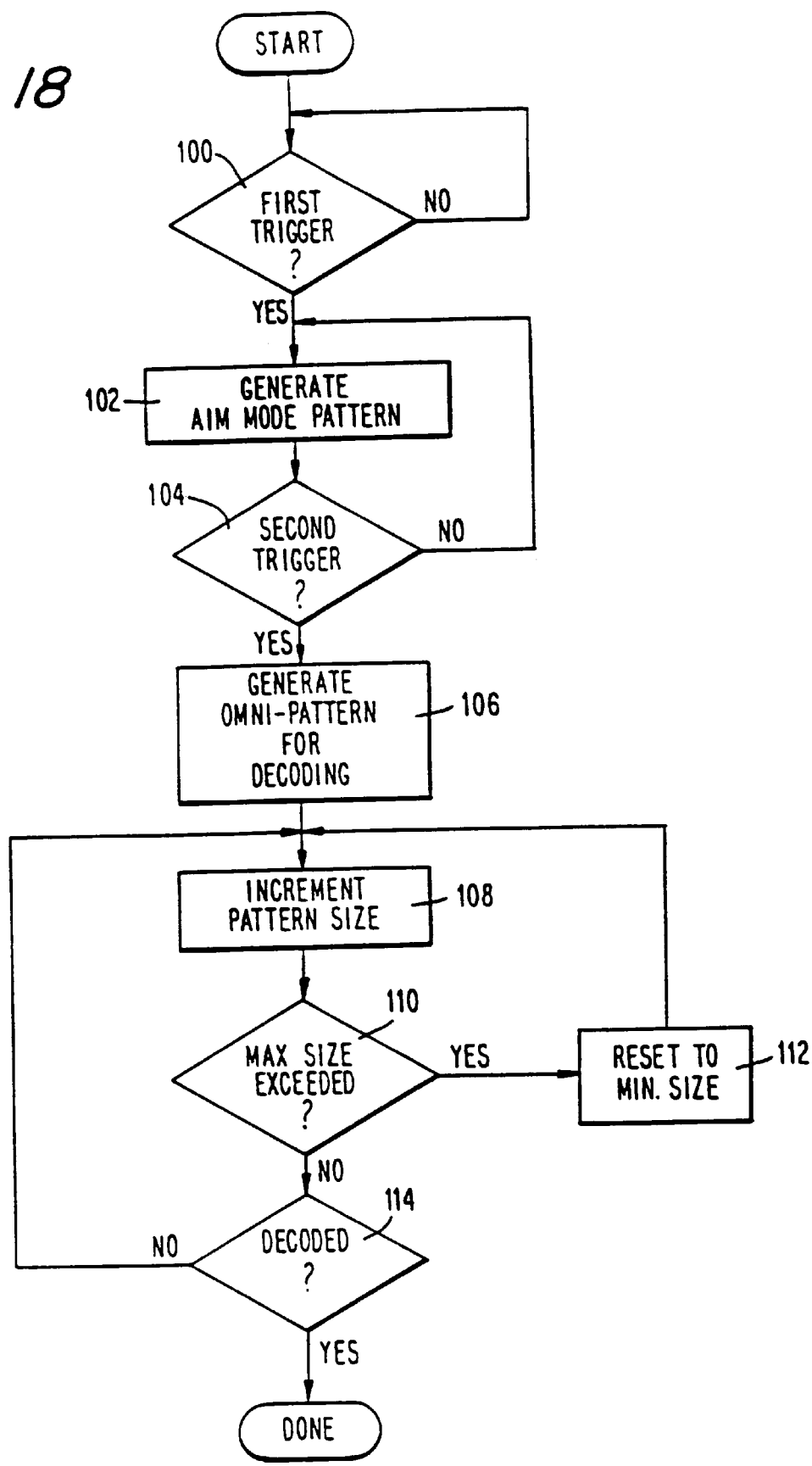
FIG. 18 is a flow chart of trigger initiated, omni-directional scan pattern generation.
Figure 19:
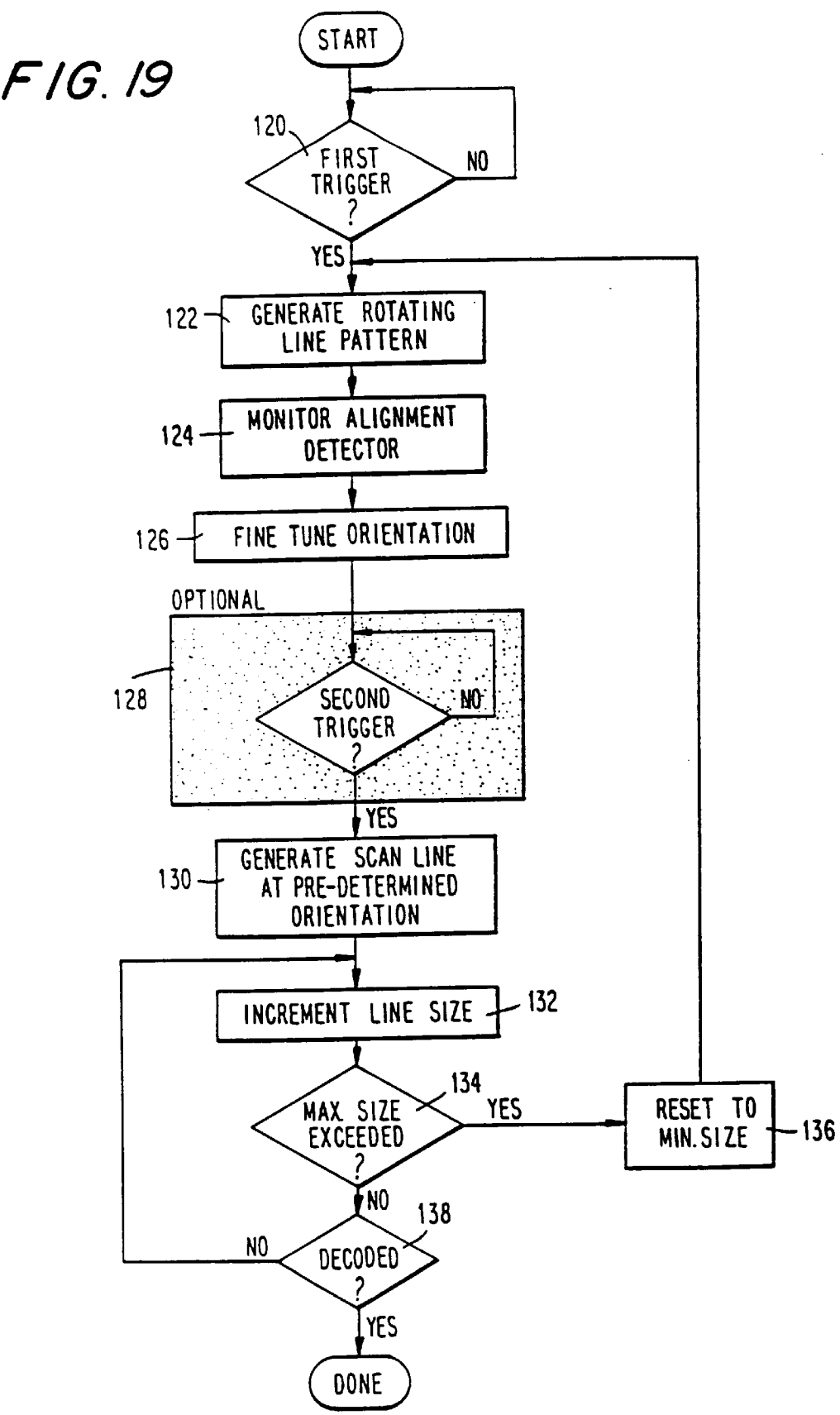
FIG. 19 is a flow chart of automatic "aim and shoot" pattern generation, in accordance with the invention.

The processors 82 of FIG. 13A and 100 of FIG. 14 are programmed to control the scanner of this invention in the aim and decode modes, either by manual (trigger) operation or automatically as described previously. Programming of the processors will now be described with reference to the flow charts of FIGS. 18 and 19. FIG. 18 represents scanner operation for either 1-D or 2-D barcodes, wherein the trigger must be operated once for aim and a second time for decode. In FIG. 19, describing a 1-D barcode scanning example, the transition between aim and decode nodes of operation is automatic. In some cases, the requirement to operate the trigger twice for aim and decode is preferable, to prevent a symbol from being decoded prematurely or decoding a neighboring barcode.

Referring to FIG. 18, the scanner awaits a first operation of the manual trigger, and when the trigger has been first depressed, as detected in step 100, the scanner generates the aim mode pattern which, as aforementioned, preferably is an omnidirectional pattern (an omnidirectional pattern is one wherein the scan angle the beam traverses over time is not limited) and may be any suitable scan pattern that is radially symmetric, e.g., not a simple raster pattern, including those shown in FIGS. 5A–E or FIG. 6; the oscillating circle or spiral pattern (FIG. 5C) being best from a standpoint of visibility and the rotating Lissajous pattern being best from the standpoint of preliminary decoding of the barcode (step 102).

The scanner now waits for another trigger operation, and when the trigger has been manually operated for the second time, as determined in step 104, an omni-pattern for decoding is generated by the scanner (step 105). In the example of FIGS. 4A and 4B, as described previously, the aim pattern in the form of a rotating Lissajous for aiming transitions converts to a raster for decoding, and as shown in FIG. 4C the aiming pattern is incremented in size (step 108) until the maximum size of the pattern is exceeded (step 110) when the scan pattern is reset in step 112 to increment again.

If, however, the barcode has been fully decoded, determined in step 114, before the maximum size of the scan pattern is exceeded, the routine is completed.

The size of each pattern increment, and the rate at which the increments are generated, are preferably controlled in response to data read from the symbol during the aim mode to achieve an optimal rate of Y-direction expansion depending on the number of rows in and height of a label. If the 2-D code is not successfully decoded at step 114, then decoding is continued until either a successful decode has occurred or until a predetermined amount of time, typically on the order of three seconds, has elapsed.

In accordance with FIG. 19, transition from the aim mode to the decode mode is made automatically, and for this example, the procedure is particularized for scanning a 1-D barcode, although the procedure could be generalized to encompass 2-D barcodes as well.

In response to manual operation of the trigger, in step 120, a rotating line pattern (step 122), corresponding to what is shown in FIG. 5E, is produced. Alignment of the rotating line pattern and barcode is monitored in step 124, and may optionally be fine tuned in accordance with step 126. Alignment may be performed in accordance with the procedure of FIG. 11 and circuit of FIG. 12.

A second manual operation of the trigger per step 128 is optional. Even if the trigger is not operated at this time, when the decoder has determined the optimum angle at which to emit a decode scan pattern, the pattern is produced (step 130). The line size is incremented (step 132) until it exceeds the length of the barcode (step 134). If the maximum size is exceeded, the size of the scan line is reduced to the minimum size for aiming (step 136) and the process repeats. During the time the length of the scan line in incremented, the barcode is being decoded, in step 138, and when decoding is completed, the routine is terminated.

In either the manual or automatic operations, the light bean directed toward the symbol to be read is transitioned between first and second scan paths in the aim and decode modes. In addition to transition between the scan paths described above, the first and second scan paths may differ from each other by rotation about an axis of rotation, by increase in scan path envelope diameter, by both rotation and envelope diameter increase and by displacement of the center of rotation of the first scan pattern.

The user can, therefore, simply aim an apparent spot on the barcode, without regard for the barcode's orientation, and then decode it upon the second trigger pull. It is also possible to provide automatic scan line opening without a second trigger pull. However, there is a danger that the scanner may unintentionally scan and decode the wrong barcode.

Figure 21A:
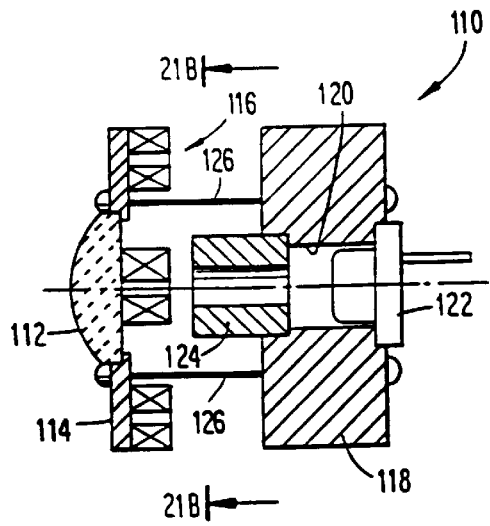
FIGS. 21A and 21B are side and front views of a miniature scanner assembly, in accordance with another embodiment of the invention.
Figure 21B:
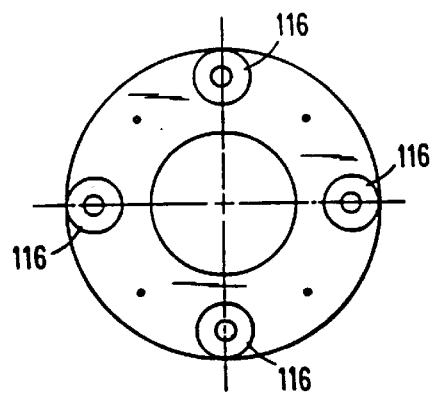

In accordance with another aspect of the invention, a first embodiment of a scanning element that may be used to produce the prescribed scan patterns is shown in FIGS. 21A and 21B. In FIG. 21A, a scan module 110 supports and oscillates an objective lens 112 that is mounted on a circuit board 114 that also carries four electric coils 116 equally spaced along the four quadrants of the circuit board. A support member 118 has a central opening 120 for receiving and retaining a light emitting diode 122 that preferably is a laser diode. At a side of the support 118, opposite the diode 122, is a permanent magnet 124 that interacts with an electromagnetic field produced by the coils 116 when an electric current is applied.

The circuit board 114 and support 118 are interconnected by four semi-rigid wires 126 that also carry electric current from a driver circuit to the four coils. By changing the connections between the coils, 1-D or 2-D scan patterns may be selectively achieved.

Wires 126 preferably are tin-soldered to the circuit board 114 and support 118. The material of the wires preferably is a phosphor-bronze alloy, although any other material that conducts electricity and provides semi-rigid support of the circuit board 114 and lens 112 with respect to support 118 may be used.

Magnet 124 is in the form of a ring, and in one embodiment may be magnetized axially. The central hole of magnet 124 serves as an aperture stop for the laser beam.

Alternatively, the permanent magnet 124 may be multiply poled around its circumference. For example, the poling of the permanent magnet may be such that there are four poles, with South poles being oriented at 0° and 180° and North poles at 90° and 270° along the circumference. By suitably energizing two of the four coils 116, the lens and coil assembly will rotate slightly, and hence the semi-rigid wires will begin to form a helix, reducing the distance between the lens 112 and laser beam source 122 to focus the beam. The other two coils are energized to oscillate the lens assembly to produce appropriate scanning.

Figure 20B:
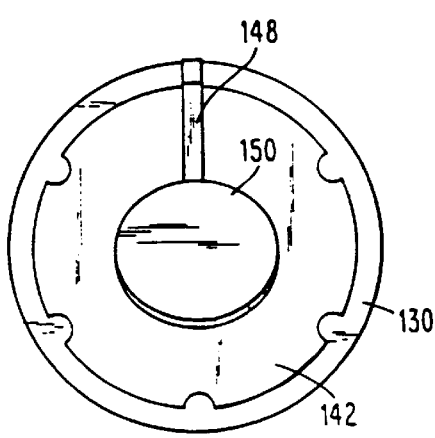
FIGS. 20A and 20B are side and front views of a miniature scanning assembly, in accordance with an embodiment of the invention.
Figure 20A:
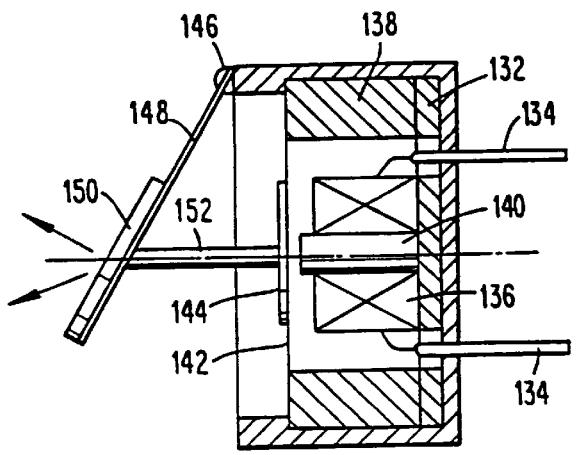

Another embodiment of scanner, shown in FIGS. 20A and 20B, comprises a casing 130, of bakelite or other suitable material, and of cylindrical configuration. Within the casing 130 is seated a soft iron disk 132 having apertures to accommodate a number of terminals 134 for supplying electric current to an electromagnetic coil 136 positioned on the disk 132. Surrounding the coil 136 within casing 130 is a ring magnet 138 for producing a magnetic field that interacts with the electromagnetic field produced by coil 136. A soft iron core 140 is positioned in the central aperture of the coil 136, and a thin diaphragm 140 of flexible material is seated on the end of magnet 138, as shown, spanning the coil 136 and its core 140. On the outer surface of the diaphragm 140, near the end of core 140 is a thin metal plate 144 of low mass.

Pivotably mounted to the end of casing 130 at 146 is a piece of film 148, preferably made of Mylar. Upon the outer surface of the membrane, at a position in longitudinal alignment with core 140, is a reflector 150. The reflector 150, together with its supporting membrane 148, is maintained separated from the diaphragm plate 144 by another piece of film 152, again preferably formed of Mylar.

Except for Mylar films 148, 152, and reflector 150, the device shown in FIGS. 20A and 20B is of a type conventionally used as an audio beeper, wherein an audio signal applied to leads 134 produce oscillation of the membrane 142 and its attached plate 144. In the present invention, mechanical coupling between reflector 150 and membrane 142, by virtue of Mylar film 152, causes the mirror 150 to oscillate correspondingly, and, if coil 136 is suitably energized, scan.

Figure 22B:
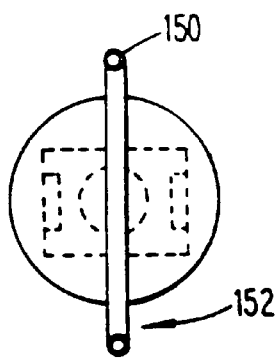
FIGS. 22A and 22B are views of a miniature scanner having an optical element mounted on two taut wires, in accordance with another embodiment of the invention.
Figure 22A:
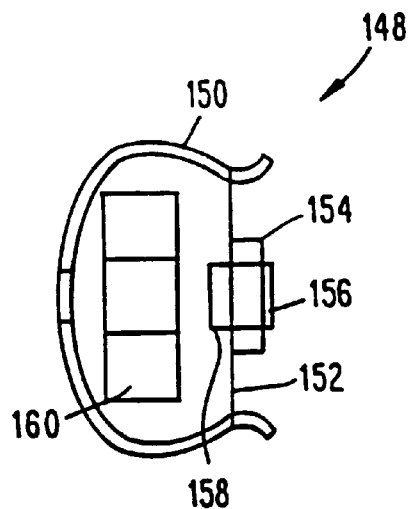

Another embodiment of a scanning mechanism, in accordance with the invention, is shown in FIGS. 22A and 22B as 148, wherein 1-D scanning is carried out by a scanning element in the form of a bracket, or tensioner, 150 that is of integral construction, generally C-shaped in configuration and resilient. Spanning the ends of the bracket 150 is a closely spaced, parallel pair of wires 152 maintained taut by the spread of the bracket. Attached to the taut wires 152, and essentially located thereon, are a reflector 154 and permanent magnet 158, secured to the wires by a clamp 156.

Within the bracket 150, behind the magnet 158, is an electromagnetic coil 160 which, when energized, produces an electromagnetic field that interacts with the field of the permanent magnet to oscillate reflector 154 in one direction, for example, the X-direction.

An important advantage of the structure of the scanner mechanism shown in FIGS. 22A and 22B is that with mirror 152 floating within the ends of bracket 150, attached to the pair of taut wires 152, strain is uniformly distributed along the wires. This represents an improvement over a scanner implementing a taut band to support an optical element, such as is described in U.S. Pat. No. 5,168,149, where strain tends to concentrate at the ends of the band.

Figure 23:
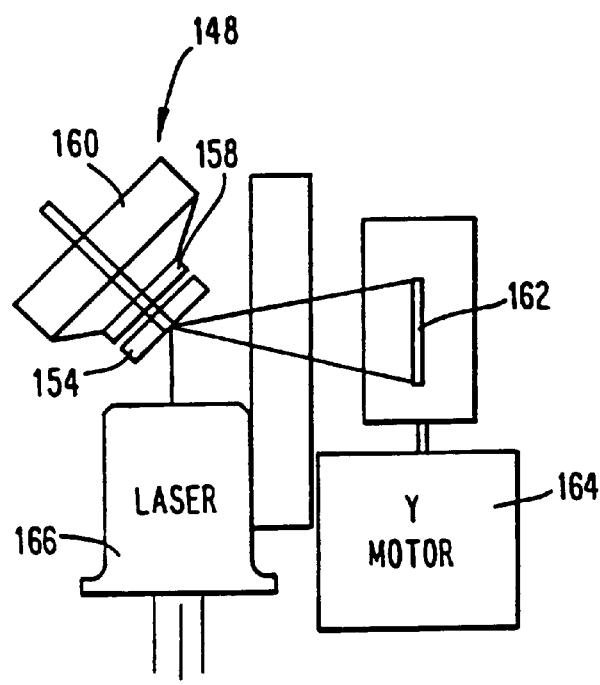
FIG. 23 is a simplified diagram showing two-dimensional scanning using an X-direction scanning element and additional Y-scanning motor.

To produce 2-D scanning using the mechanism of FIG. 22, a separate reflector 162, for deflecting the light beam in the Y-direction, is oscillated by a Y-motor 164. The configuration, shown in FIG. 23, with the taut-wire X-scanner 148 of FIG. 22, together with a laser beam source 166 and Y-scanner 162, 164 in the configuration shown, produces a compact scanner assembly.

Figure 24:
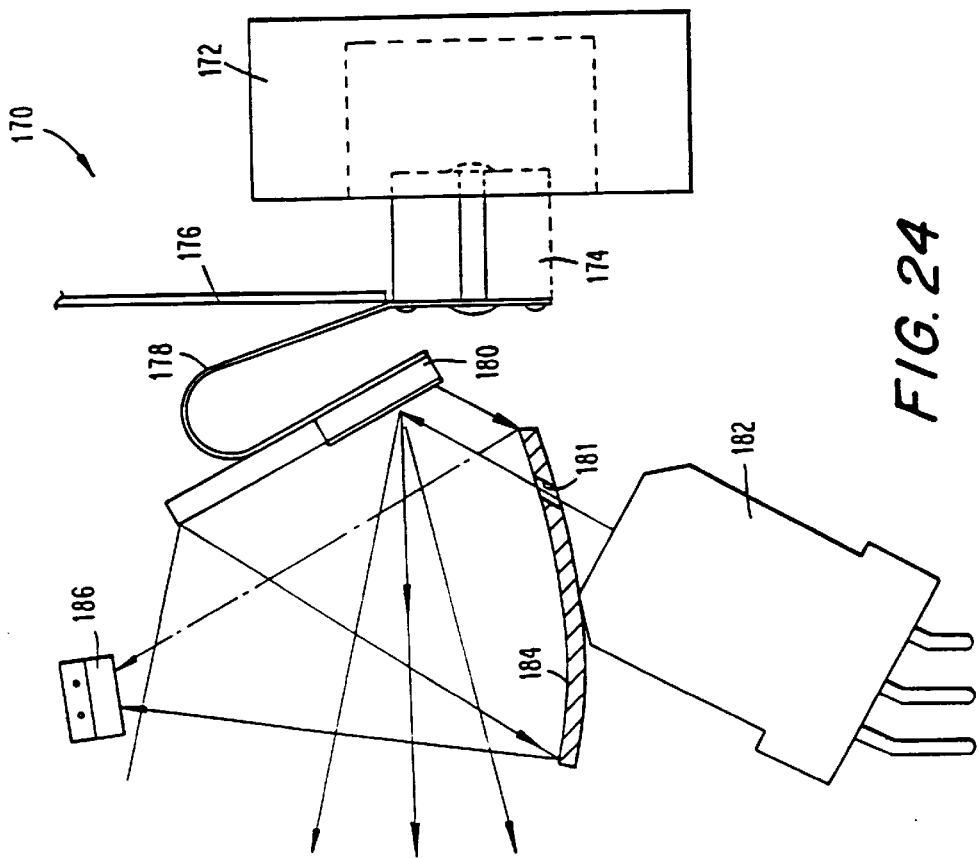
FIG. 24 is a symbolic drawing of a scanning assembly having a low-mass reflector oscillated by a permanent magnet-electromagnet mechanism.

Another embodiment of scanner, shown in FIG. 24, comprises an electromagnetic coil 172 having a central opening into which partially extends and electromagnetic coil 174. The coil 172 is rigidly secured to a support member (not shown), and the magnet 174 is resiliently coupled to the same support by means of an am 176.

A U-shaped spring 178 is attached to the magnet 174 at one end, and the opposite end of the spring supports an optical element, preferably a reflector 180. Electrical leads (not shown) carry an energizing current or drive signal to the coil of electromagnet 174. The reflector 180 will oscillate in response to such electromagnet coil signal so as to scan in one or two dimensions, selectively. The spring 178 may be made of any suitable flexible materials, such as a leaf spring, a flexible metal coil or a flat bar having sufficient flexibility properties, and may be of a material such as a beryllium-copper alloy.

The reflector 180 is positioned between a laser beam source and lens assembly 182 and a target (not shown in FIG. 24). Between the reflector 180 and source 182 is a collector 184 having an opening through which a light beam emitted by the laser source 182 may pass to the reflector 180. The collector is oriented so as to direct incoming light, reflected by ref lector 180 and then collector 184, to a photodetector 186.

Figure 25:
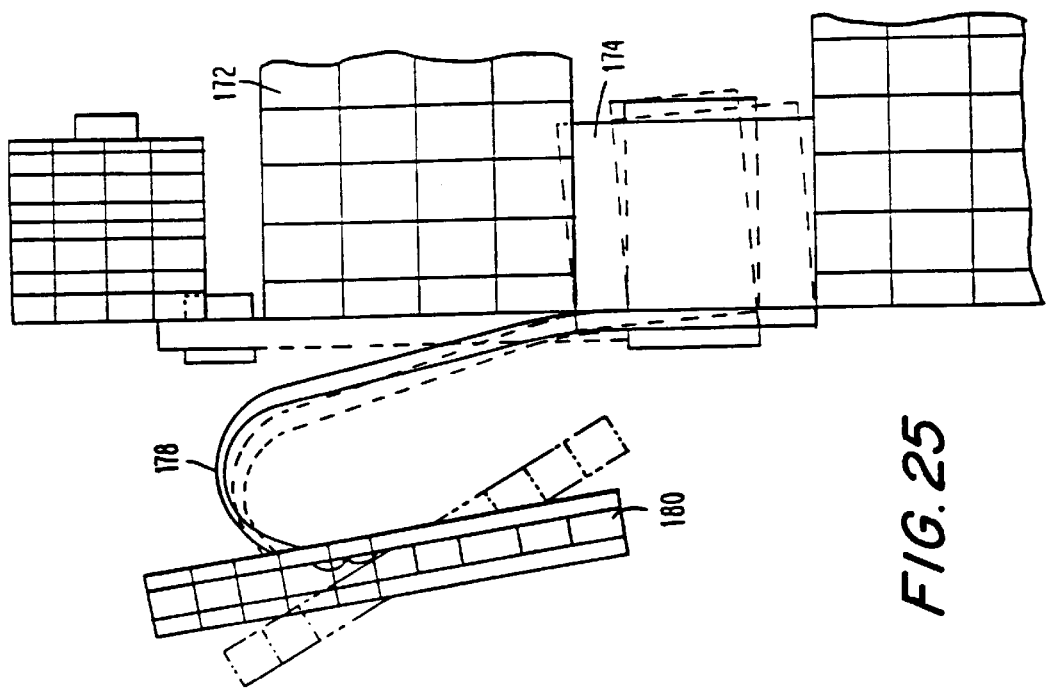
FIG. 25 is a diagram showing that the angle of oscillation of the low-mass reflector is considerably greater than that of the permanent magnet to which it is mechanically coupled.

An important aspect of the embodiment of FIG. 24 is that the mass of reflector 180 is considerably leas than the mass of permanent magnet 174. The mass of the mirror is selected to be less than about one-fifth the mass of the magnet, and the angle of vibration of the mirror as shown in FIG. 25, a diagram derived by computer simulation, is about seven times that of the permanent magnet.

The reflector 180 is capable of 2-D scanning. As described in copending application Ser. No. 07/943,232, filed on Sep. 10, 1992, the U-shaped spring 178, which may be formed of a plastic material, such as Mylar or Kapton, the arms of the U-shaped spring 178 and the planar spring 176 may be arranged to vibrate in planes which are orthogonal to each other. Oscillatory forces applied to permanent magnet 174 by the electromagnetic 172 can initiate desired vibrations in both of the springs 178 and 176 by carefully selecting drive signals applied to various terminals of the coil, as discussed in the copending application. Because of the different frequency vibration characteristics of the two springs 178 and 176, each spring will oscillate only at its natural vibration frequency. Hence, when the electromagnetic 172 is driven by a super position signal of high and low frequency components, the U-shaped spring will vibrate at a frequency in the high range of frequencies, and the planar spring 175 will vibrate at a frequency in the low range of frequencies.

An additional important aspect of the embodiment of FIG. 24 is that the laser beam emitted by source 182 impinges the reflector 180 at an angle that is orthogonal to the axis of rotation of the reflector. Hence, the system avoids droop in the 2-D scan pattern that tends to arise when the angle of incidence of the laser beam is non-orthogonal to the reflective surface.

Another important aspect of FIG. 24 is in the folded or "retro" configuration shown, with the laser beam source 182 off axis from that of the beam directed from the reflector 180 to the target. The detector field of view follows the laser path to the target by way of collector 184. The folded configuration shown is made possible by opening 181 in the collector. The retro configuration enables the scanning mechanism to be considerably more compact than heretofore possible.

Optionally, the bracket 116 may be mounted on an extension tube 124, shown in FIG. 26B, so as to offset the module 30 from a support surface and enable tall items to be scanned.

Hence, as described herein, the invention produces a rotating Lissajous scan pattern or other pattern that is easily seen by the user during aiming on a barcode, and then under manual control or automatically converts to a decode scan that is robust and opens at a rate, and to a size, that depends upon the barcode itself. If the barcode is a 1-D code, the decode pattern may be a precessing raster that is able to scan rows that are rotationally misaligned with the scan lines. Scanning is implemented by novel miniature 1-D and 2-D scanning assemblies, as described herein.

Another form of scanner that can produce the required two-dimensional scanning patterns is of a type implementing a scan element supported by a holder structure mounted on a mylar motor to produce oscillatory movements, the arrangement being mounted on a printed circuit board within a housing that can be manually held. The scanning motor and arrangement may be made of components formed essentially of molded plastic material, and utilizing of a mylar leaf spring to limit scan. See, for example, application Ser. No. 07/812,923, filed Dec. 24, 1991, assigned to the assignee of this invention and incorporated herein by reference.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

Omni-directional laser based bar code readers generally have regions in their scan pattern where reduced height (truncated) bar codes cannot be decoded. These regions are generally referred to as scan pattern "dead-zones" or "holes." An increasing number of users are printing highly truncated bar codes because they simply take up less room on product labels. When scanning these truncated bar codes with prior art scan patterns, the user may have a difficult time obtaining successful decodes because of scan lines not sufficiently crossing the code as it is being brought through the pattern. Failure to obtain a high first pass read rate reduces work throughput and increases operator fatigue. In order to reduce the dead zones of these omni-directional scan patterns, bar code manufacturers can add more reflecting surfaces so as to increase the number of scan line orientations. However, if the scan pattern size and signal collection area must remain unchanged so as to maintain good performance, the product volume will increase undesirably.

Figure 28:
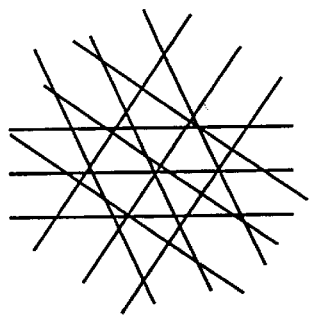
FIG. 28 is a prior art scan pattern.

Today's omni-directional "pass-through" or projection scanner product offerings typically produce a scan pattern that has a number of cross hashed lines such as those shown in FIG. 28.

Occasionally, an additional motor and mirror are added to the scanner in order to dither these scan lines so that the, dead-zones can be reduced. In addition, more mirror facets can be added in order to increase the number and orientation of these lines. However, these approaches undesirably add volume, cost, and complexity to the system.

Figure 29:
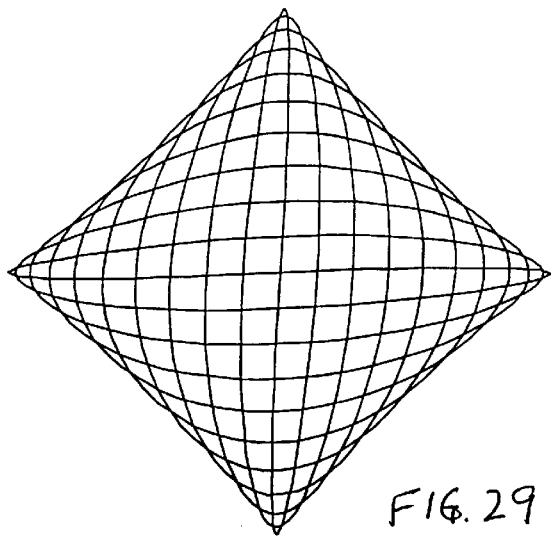
FIGS. 29, 30 and 31 are scan patterns according to this invention.

In accordance with this invention, a grid-like pattern can be generated, as shown in FIG. 29, with two oscillating mirrors running at a higher and a lower frequency that are a ratio of 1.1 to about 1.3 apart.

Figure 30:
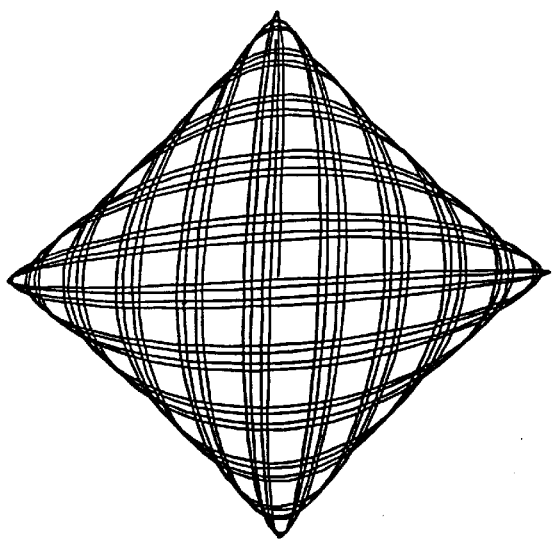

If this ratio is slightly different from 1.1, for example, 1.09, then all the lines of the grid pattern will be dithering, or moving across the scan pattern, as shown in FIG. 30. This is desirable in order to further eliminate holes in the pattern.

In order to maximize the number of grid line orientations, the entire pattern is rotated at a particular rate.

Figure 31:
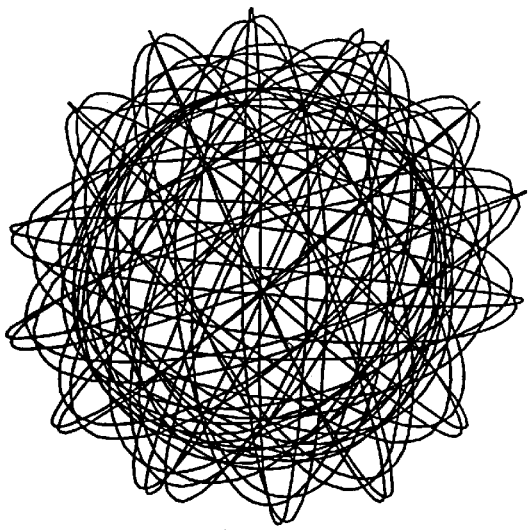

If it is rotated at a rate of about one to four degrees per half-cycle of the higher frequency, a very dense and highly aggressive omni-directional scanning pattern results. A time elapsed trace is shown in FIG. 31.

Selecting the rate of rotation involves a trade-off between the maximum levels of truncation that the code can have and the transport speed at which it can be read. The slower rotation, the more truncated the code can be, but the slower the bar code can move across the pattern. However, if the scan frequencies can be increased (usually at the expense of higher power consumption, and higher system bandwidth) then both high transport speeds and high truncation level bar codes can be accommodated. The preferred rotation rate is one degree per half cycle of the highest frequency.

A prototype scanner was built using this high performance omni-directional scan pattern. The noted benefits are summarized below:

1. It decodes extremely truncated bar codes more aggressively than a fixed pattern scanner.

2. When running at 300 Hertz (600 scans/sec), it has a 100% first pass read rate on standard UPC bar codes at transport speeds >100 inches per second. A fixed pattern scanner running at more than twice the scan rate has a comparable transport speed.

3. Since the pattern is not static, the user does not have to move the bar code relative to the scan pattern lines when in a dead-zone. That is, the pattern is dithering in both x, y, and rotational directions. This appears to provide significant benefits for hand-held use.

4. Can be implemented with two oscillating mirrors in order that the scan pattern size be changeable for better aiming control, visibility, and decodability. Static patterns of the type depicted in FIG. 28 cannot be implemented with oscillating mirrors because the discontinuous lines would require that the mirrors be capable of extremely large (theoretically infinite) accelerations. Therefore, the size of these patterns are not adjustable.

We claim:

1. A reader for electro-optically reading bar code symbols, comprising:
   a) a light source for directing a light beam along an optical path to a bar code symbol for reflection therefrom;
   b) a light sensor for detecting light reflected off the symbol over a field of view; and
   c) a scanner for omni-directionally scanning at least one of the light beam and the field of view, the scanner including
      i) a first oscillatable reflector mounted for back-and-forth movement in opposite circumferential directions relative to a first axis,
      ii) a second oscillatable reflector mounted for back-and-forth movement in opposite circumferential directions relative to a second axis,
      iii) an oscillating drive for oscillating the first reflector at a first scan frequency to scan said one of the light beam and the field of view in a first plurality of back-and-forth scan lines extending generally along a longitudinal direction lengthwise of the symbol, and for oscillating the second reflector at a different, second scan frequency to scan said one of the light beam and the field of view in a second plurality of back-and-forth scan lines extending along a transverse direction heightwise of the symbol, said first and second scan frequencies being apart in a frequency ratio ranging from about 10% to about 30% to create a scan grid pattern generally lying in a scan plane that is generally orthogonal to the optical path, said scan grid pattern being constituted of the first plurality of the scan lines intersecting the second plurality of the scan lines, and
      iv) a rotating drive for rotating the reflectors to rotate the scan grid pattern about a third axis that is generally orthogonal to the scan plane.

2. The reader according to claim 1, wherein the light source is a laser for generating the light beam as a laser beam.

3. The reader according to claim 1, wherein the light sensor is a photodiode for generating an electrical signal indicative of the detected intensity of the reflected light.

4. The reader according to claim 1, wherein each reflector is a light-reflecting mirror.

5. The reader according to claim 1, wherein one of the first and second scan frequencies is higher than the other of the first and second scan frequencies, and wherein the rotating drive rotates the scan grid pattern at a rate of rotation ranging from about one to four degrees per half-cycle of the higher of the first and second scan frequencies.

6. The reader according to claim 1, wherein the symbol is truncated along the transverse direction.

7. The reader according to claim 6, wherein the rotating drive rotates the scan grid pattern at a rate of rotation that is inversely proportional to the truncation of the symbol.

8. The reader according to claim 5, wherein the rate of rotation is one degree per half-cycle of the higher of the first and second scan frequencies.

9. The reader according to claim 1, wherein the first and second scan lines intersect generally along mutually orthogonal directions in a central area of the scan grid pattern.

10. A method of electro-optically reading bar code symbols, comprising the steps of:
    a) directing a light beam along an optical path to a bar code symbol for reflection therefrom;
    b) detecting light reflected off the symbol over a field of view; and
    c) omni-directionally scanning at least one of the light beam and the field of view, including the steps of
       i) mounting a first oscillatable reflector for back-and-forth movement in opposite circumferential directions relative to a first axis,
       ii) mounting a second oscillatable reflector for back-and-forth movement in opposite circumferential directions relative to a second axis,
       iii) oscillating the first reflector at a first scan frequency to scan said one of the light beam and the field of view in a first plurality of back-and-forth scan lines extending generally along a longitudinal direction lengthwise of the symbol, and oscillating the second reflector at a different, second scan frequency to scan said one of the light beam and the field of view in a second plurality of back-and-forth scan lines extending along a transverse direction heightwise of the symbol, said first and second scan frequencies being apart in a frequency ratio ranging from about 10% to about 30% to create a scan grid pattern generally lying in a scan plane that is generally orthogonal to the optical path, said scan grid pattern being constituted of the first plurality of the scan lines intersecting the second plurality of the scan lines, and
       iv) rotating the reflectors to rotate the scan grid pattern about a third axis that is generally orthogonal to the scan plane.

11. The method according to claim 10, wherein the directing step is performed by a laser for generating the light beam as a laser beam.

12. The method according to claim 10, wherein the detecting step is performed by a photodiode for generating an electrical signal indicative of the detected intensity of the reflected light.

13. The method according to claim 10, wherein each reflector is a light-reflecting mirror.

14. The method according to claim 10, wherein one of the first and second scan frequencies is higher than the other of the first and second scan frequencies, and wherein the rotating step is performed by rotating the scan grid pattern at a rate of rotation ranging from about one to four degrees per half-cycle of the higher of the first and second scan frequencies.

15. The method according to claim 10, wherein the symbol is truncated along the transverse direction.

16. The method according to claim 15, wherein the rotating step is performed by rotating the scan grid pattern at a rate of rotation that is inversely proportional to the truncation of the symbol.

17. The reader according to claim 14, wherein the rate of rotation is one degree per half-cycle of the higher of the first and second scan frequencies.

18. The reader according to claim 10, wherein the first and second scan lines intersect generally along mutually orthogonal directions in a central area of the scan grid pattern.

19. A reader for electro-optically reading truncated bar code symbols of reduced height, comprising:
   a) a laser for directing a laser beam along an optical path to a bar code symbol for reflection therefrom;
   b) a photosensor for detecting laser light reflected off the symbol over a field of view; and
   c) a scanner for omni-directionally scanning at least one of the laser beam and the field of view, the scanner including
      i) a first oscillatable mirror mounted for back-and-forth movement in opposite circumferential directions relative to a first axis,
      ii) a second oscillatable mirror mounted for back-and-forth movement in opposite circumferential directions relative to a second axis,
      iii) an oscillating drive motor for oscillating the first mirror at a first scan frequency to scan said one of the laser beam and the field of view in a first plurality of back-and-forth scan lines extending generally along a longitudinal direction lengthwise of the symbol, and for oscillating the second mirror at a different, second scan frequency to scan said one of the laser beam and the field of view in a second plurality of back-and-forth scan lines extending along a transverse direction heightwise of the symbol, said first and second scan frequencies being apart in a frequency ratio ranging from about 10% to about 30% to create a scan grid pattern generally lying in a scan plane that is generally orthogonal to the optical path, said scan grid pattern being constituted of the first plurality of the scan lines intersecting the second plurality of the scan lines, and
      iv) a rotating drive motor for rotating the mirrors to rotate the scan grid pattern about a third axis that is generally orthogonal to the scan plane.

20. The reader according to claim 19, wherein one of the first and second scan frequencies is higher than the other of the first and second scan frequencies, and wherein the rotating drive motor rotates the scan grid pattern at a rate of rotation ranging from about one to four degrees per half-cycle of the higher of the first and second scan frequencies.

* * * * *